US012079612B2

(12) United States Patent
Banik et al.

(10) Patent No.: US 12,079,612 B2
(45) Date of Patent: Sep. 3, 2024

(54) FIRMWARE BOOT TASK DISTRIBUTION TO ENABLE LOW LATENCY BOOT PERFORMANCE

(71) Applicant: Intel Corporation, Santa Clara, CA (US)

(72) Inventors: Subrata Banik, Bangalore (IN); Vincent Zimmer, Issaquah, WA (US); Rajaram Regupathy, Bangalore (IN); Ravi Poovalur Rangarajan, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 720 days.

(21) Appl. No.: 17/113,771

(22) Filed: Dec. 7, 2020

(65) Prior Publication Data

US 2021/0089296 A1    Mar. 25, 2021

(51) Int. Cl.
| | | |
|---|---|---|
| *G06F 8/65* | (2018.01) | |
| *G06F 9/4401* | (2018.01) | |
| *G06F 9/48* | (2006.01) | |
| *G06F 9/50* | (2006.01) | |
| *G06F 15/78* | (2006.01) | |

(52) U.S. Cl.
CPC ............ *G06F 8/65* (2013.01); *G06F 9/4401* (2013.01); *G06F 9/4843* (2013.01); *G06F 9/5027* (2013.01); *G06F 15/7807* (2013.01)

(58) Field of Classification Search
CPC ........ G06F 8/65; G06F 9/4401; G06F 9/4843; G06F 9/5027; G06F 15/7807
USPC .......................................................... 713/2
See application file for complete search history.

(56) References Cited

U.S. PATENT DOCUMENTS

| | | | | |
|---|---|---|---|---|
| RE40,092 E | * | 2/2008 | Kang | G06F 9/4401 |
| | | | | 713/1 |
| 7,669,044 B2 | * | 2/2010 | Fitzgerald | G06F 9/4401 |
| | | | | 711/158 |
| 8,151,102 B2 | * | 4/2012 | Itoh | G06F 9/4401 |
| | | | | 714/36 |
| 10,561,852 B2 | * | 2/2020 | Murphy | A61N 1/3993 |
| 2019/0042229 A1 | * | 2/2019 | Kotary | G06F 8/65 |
| 2019/0332425 A1 | * | 10/2019 | Narayana | G06F 9/3851 |
| 2022/0012062 A1 | * | 1/2022 | Banik | G06F 11/3409 |

FOREIGN PATENT DOCUMENTS

WO    WO-2010090636 A1 *  8/2010  ........... G06F 9/4401

OTHER PUBLICATIONS

"Advanced Configuration and Power Interface (ACPI) Specification," UEFI Forum, Inc., Version 6.3, Jan. 2019, 1239 pages.

* cited by examiner

*Primary Examiner* — Brian T Misiura
(74) *Attorney, Agent, or Firm* — Jordan IP Law, LLC

(57) ABSTRACT

Systems, apparatuses and methods may provide for technology that identifies, during a first boot process, whether at least one task associated with at least one software program is set to occur in a single-threaded process or a multithreaded process, in response to the at least one task being set to occur in the multithreaded process, executing the at least one task in the multithreaded process during the first boot process, and in response to the at least one task being set to occur in the single-threaded process, executing the at least one task in the single-threaded process during the first boot process.

25 Claims, 13 Drawing Sheets

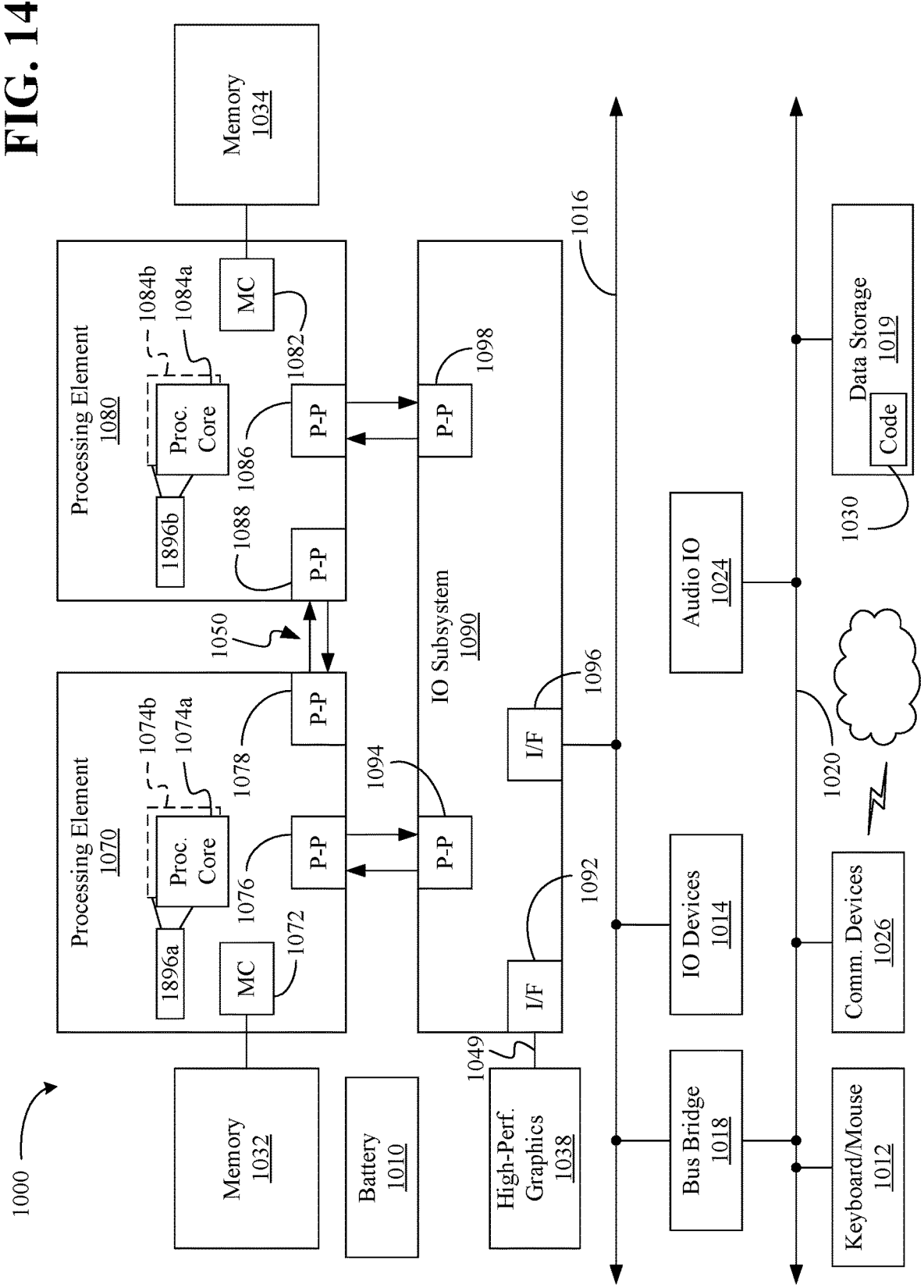

FIRMWARE BOOT TASK DISTRIBUTION TO ENABLE LOW LATENCY BOOT PERFORMANCE

CROSS-REFERENCE TO RELATED APPLICATION

The present application claims priority to Indian Patent Application No. 202041042915, filed on Oct. 2, 2020.

TECHNICAL FIELD

Embodiments generally relate to enhanced firmware updates. More particularly, embodiments relate to a firmware boot process where singleton processes, such as firmware updates among others, may be identified and executed concurrently with other boot process tasks to reduce boot flow latency time and also reduce computing resources.

BACKGROUND

Some applications and computing architectures may seek to achieve reduced or nearly instant system boot up time. Boot processes may include updates to firmware such as Basic Input/Output System (BIOS), Unified Extensible Firmware Interface (UEFI), System-on-Chip (SoC) firmware (e.g., silicon hardware), Platform firmware, etc. Updates to firmware may hinder system performance, particularly during boot times due to high latency operations and serial operations. For example, a firmware update may takes place during a boot path where an entire boot process is in sequential order, and thus it may be difficult, if not impossible, to meet latency expectations that system firmware may be able to complete all device (e.g., SoC and Platform) firmware processes and/or updates (e.g., measuring firmware components, verifying firmware components, loading firmware into devices, reading firmware versions back to ensure successful firmware updates) within a desired time window (e.g., less than 500 ms-1 sec.).

BRIEF DESCRIPTION OF THE DRAWINGS

The various advantages of the embodiments will become apparent to one skilled in the art by reading the following specification and appended claims, and by referencing the following drawings, in which:

FIG. 14 is a block diagram of an example of a multiprocessor based computing system according to an embodiment.

DESCRIPTION OF EMBODIMENTS

Some architectures may lack informativeness in firmware boot process to effectively use existing processor power and system resource by bootloader or firmware software (e.g., a Firmware Support Package [FSP]) to initiate SoC elements and/or platform devices. For example, an update and/or initialization process of an entire boot process may occur in a single threaded environment on a single Boot Strap Processor (BSP) even after multicores become available. Such an inefficient boot process has an increased boot latency due to waiting for sequential firmware updates, hardware initializations and/or code execution to complete. Thus, such a boot process results in elevated wait times for firmware and/or bootloader to complete execution on the BSP. Furthermore, execution of the entire boot process in a multi-threaded environment may unnecessarily consume resources in portions of the boot process that would be more efficient in a single-threaded environment due to increased complexity, adaptations to a multi-threaded environment and/or increased inter-communication difficulties.

Figure 1:
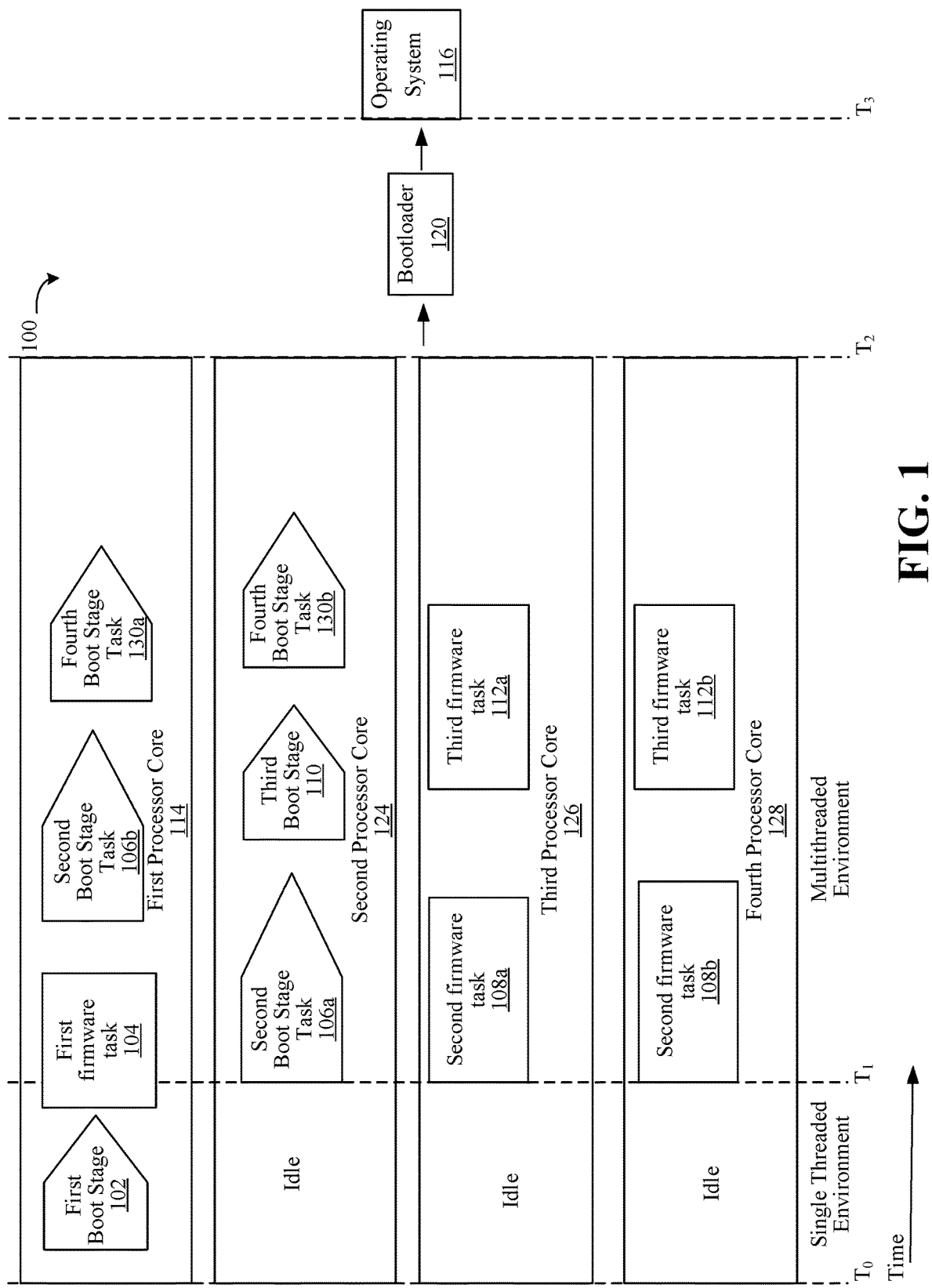
FIG. 1 is a process of an example of an informed boot process according to an embodiment.

Turning now to FIG. 1, some embodiments include a flexible boot management process 100 in which some boot phases may run in a single threaded environment, and other boot phases may run in a multithreaded environment. By alternating between the single threaded environment and the multithreaded environment, the process 100 may reduce latency while also streamline operations and reduce power consumption as opposed to a boot process that executes only in a single-threaded environment, or a boot process that executes only in a multi-threaded environment. Moreover, various tasks and stages may be broken up to execute across an array of processor cores, such as first processor core 114, second processor core 124, third processor core 126 and fourth processor core 128.

That is, some embodiments implement an informed boot process by identifying scenarios to initiate concurrency in the boot process by running singleton tasks (e.g., firmware updates to silicon components on a SoC) which may be executed concurrently with bootloader tasks (e.g., boot stage tasks associated with platform devices). The bootloader 120 may operate as a context master in a computing system to allocate resources (e.g., processor cores) between the firmware tasks and the bootloader. For example, the bootloader 120 (e.g., BIOS, UEFI, etc.) may access a data structure that identifies when to initiate operations in a multithreaded environment. The data structure may be referred to as an informative enhancement table (IET) and may be set during a previous execution of a previous boot process and/or execution of an operating system (OS) of the system. The flexible boot management process 100 may be referred to as a first boot process, and the previous boot process may be referred to as a second boot process. The previous boot process (e.g., hard boot, soft boot, warm boot, cold boot, etc.) may have executed and completed prior to the flexible boot management process 100 (e.g., the first boot process and/or a current boot process) to load the OS, and enhancements may be identified based on the latencies identified during the previous boot process to enhance the flexible boot management process 100 (e.g., execute longer latency firmware processes in multiple threads). For example, the previous boot process may complete to boot the system to load the OS. Thereafter (e.g., after the OS is loaded by the previous boot process), the system may be placed into a different state (e.g., mode switch, sleep state, hibernation state, soft off state, mechanical off state, etc.). The flexible boot management process 100 may then begin to execute to boot to a fully operational state (e.g., boot to a full operational OS for use by a user) from the different state to selectively apply some processes in the multithreaded environment based on the IET. For example, one or more of a firmware or OS may set the IET based on an analysis of the previous boot process to indicate that one or more of a firmware update or a firmware execution to initiate hardware devices may be executed in a multi-threaded environment in boot processes following the previous boot process. For example, if a firmware was identified as having an execution latency during the previous boot process above a threshold, the IET may be set to indicate that the firmware will be initialized and executed in the multithreaded environment during a following boot process. The IET may also include an indication that firmware is to be updated in a multi-threaded environment. The bootloader 120 may further address memory allocation (e.g., utilize varying levels and types of cache and/or memory) to avoid insufficient memory at pre-memory stage to execute operations in parallel. Thus, boot process 100 may include a multithreaded firmware execution to reduce hardware initialization times and/or executing SoC firmware updates and hardware initializations in parallel with platform device firmware updates and hardware initializations to reduce firmware update and initialization times to reduce an overall latency of the boot process. Notably, not all processes may be set in the multi-threaded environment. Rather, only those processes that are identified as having longer latencies during the previous boot process may be executed in the multi-threaded environment during the process 100, while other lower latency processes may be executed in the single threaded environment.

In FIG. 1, the single threaded environment operates from time $T_0$ to $T_1$ (e.g., a first time period) while the multi-threaded environment operates from time $T_1$ to $T_2$ (e.g., a second time period). During time $T_0$ to $T_1$, a computing system may execute a first boot stage 102 on the first processor core 114. For example, the first boot stage 102 may load a bootloader from a storage (e.g., a boot block, boot sector or partition) of the system to boot the system. Such an operation may be executed before other firmware updates and initializations may occur in parallel, and hence execute in a single threaded environment to avoid unneeded multi-threaded operations.

Thereafter, at time $T_1$ the process 100 may identify from the IET that firmware associated processes may be executed in parallel in a multi-threaded environment to enhance performance and reduce an overall boot time. Thus, the system may switch to a multithreaded environment in which the first processor core 114, the second processor core 124, the third processor core 126 and the fourth processor core 128 may be divided between firmware associated tasks for SoC components and other boot stage tasks. For example, a bootloader may assign the first processor core 114, the second processor core 124, the third processor core 126 and the fourth processor core 128 to either execute SoC associated firmware updates or other boot stage tasks, and reallocate as needed.

In some embodiments, the first processor core 114 may correspond to a BSP and execute a first firmware task 104 to initiate the multithreaded environment. Thereafter, the first processor core 114 may execute boot stage tasks including firmware tasks for platform components outside of the SoC and/or communicatively coupled to the SoC. The second processor core 124, the third processor core 126 and the fourth processor core 128 may execute boot stage tasks or firmware tasks (e.g., initializations of hardware and/or updates to firmware) in the multithreaded environment. In this example, the first processor core 114 and the second processor core 124 may be associated (e.g., and/or dedicated) to bootloader tasks to execute boot stage tasks (including firmware platform initializations) while the third processor core 126 and the fourth processor core 128 may be assigned and/or dedicated to execute SoC firmware tasks.

In the multithreaded environment, operations may run in parallel. For example, a first firmware task 104 may execute on the first processor core 114. The first firmware task 104 may initialize temporary random-access memory (RAM) along with any other early initializations.

A second boot stage (e.g., initialization of memory such as Dynamic random-access memory and preparation for platform device initiations) may be divided into a first subset of tasks and a second subset of tasks. The first subset of tasks may be illustrated as a second boot stage task 106a and the second subset of tasks may be illustrated as a second boot stage task 106b. The first subset of tasks may be different from the second subset of tasks. Concurrently with the execution of the first firmware task 104 on the first processor core 114, the second boot stage task 106a may execute on the second processor core 124. After the first firmware task 104 has completed on the first processor core 114, the first processor core 114 may execute the second boot stage task 106b. The second boot stage task 106a and the second boot stage task 106b may execute concurrently for some period of time.

A second firmware update and/or execution (e.g., initialize the permanent memory along with any other early silicon initialization, may be a firmware support package) may be divided into a first subset of tasks, referred to as the second firmware task 108a, and a second firmware of tasks, referred to as the second update task 108b. The second firmware task 108a may execute on the third processor core 126 and the second update task 108b may execute on the fourth processor core 128. As illustrated, the second boot stage task 106a, the second boot stage task 106b, the second firmware task 108a and the second firmware task 108b may execute concurrently on the first processor core 114, the second processor core 124, third processor core 126 and fourth processor core 128.

After the second boot stage task 106a is completed, the second processor core 124 may execute a third boot stage 110 (e.g., tears down cache-as-a ram architecture utilized during early boot stages and loads the ramstage). A third firmware update and/or task (e.g., complete silicon initialization including central processing unit (CPU) and input/output (I/O) controller initializations) may be divided into a first subset of tasks, which may be referred to as third firmware task 112a, and a second subset of tasks which may be referred to as a third firmware task 112b. The third processor core 126 may execute the third firmware task 112a while the fourth processor core 128 concurrently executes the third firmware task 112b. As illustrated, the third boot stage 110, the second boot stage task 106b, the third firmware task 112a and the third firmware task 112b may be concurrently executed.

A fourth boot stage (e.g., main device initiation such as Peripheral Component Interconnect (PCI) device initiation, trusted platform module initiation, graphics initiation, and/or etc.) may be divided into a first subset of tasks, which may be referred to as fourth boot stage task 130a, and a second subset of tasks which may be referred to as a fourth boot stage task 130b. The fourth boot stage task 130a may be execute on the first processor core 114 and the fourth boot stage task 130b may execute on the second processor core 124. As illustrated, the fourth boot stage task 130a, fourth boot stage task 130b, third firmware task 112a and third firmware task 112b may execute concurrently.

At time $T_2$, the bootloader 120 may continue to execute. For example, the bootloader 120 may pass kernel boot partition buffer generated during the boot process and boot to the operating system 116. Thereafter, the operating system 116 may be loaded at time $T_3$.

Thus, as illustrated above, the process 100 may seamlessly shift between a single threaded environment to a multithreaded environment to efficiently load the operating system 116 with reduced latency. Doing so may reduce the time to load by a significant margin as opposed to a completely single threaded boot process, and reduce inefficiencies (e.g., software complexity and communication difficulties) caused by a completely multi-threaded boot process.

For example, in a completely single threaded boot process environment, firmware initialization (e.g., SoC firmware) may be idle when the bootloader is executing on the BSP, and likewise the bootloader may be idle when the SoC firmware is executing on the BSP. Such a serialized process results in discrete and serial platform initialization where each independent device (e.g., processor cores) initialization and/or update is waiting for a respective execution time or turn (e.g., in serial). Moreover, operating each firmware update in serial may be an ineffective usage of processor power since not all computing resources are utilized. Doing so results in higher platform boot time, inefficient use of resources and poor user experiences. Subsequently a user may avoid accepting firmware updates which may result in updates being avoided which may result in detrimental performance, such as platform security issues.

Further, in a completely multithreaded boot process environment, some static tasks may execute over parallel threads, but the default static nature of multithreaded boot may increase complexity and complicate other aspects (e.g., debugging, development, communication, managing concurrency, porting existing code, overhead of switching contexts, etc.). Thus, some embodiments include an informative boot-process that avoids making platform a fully multi-threaded or single thread execution unless advantages are identified from the IET data structure referenced above. Some aspects described herein may be implemented in a One application programming interface system.

Figure 2:
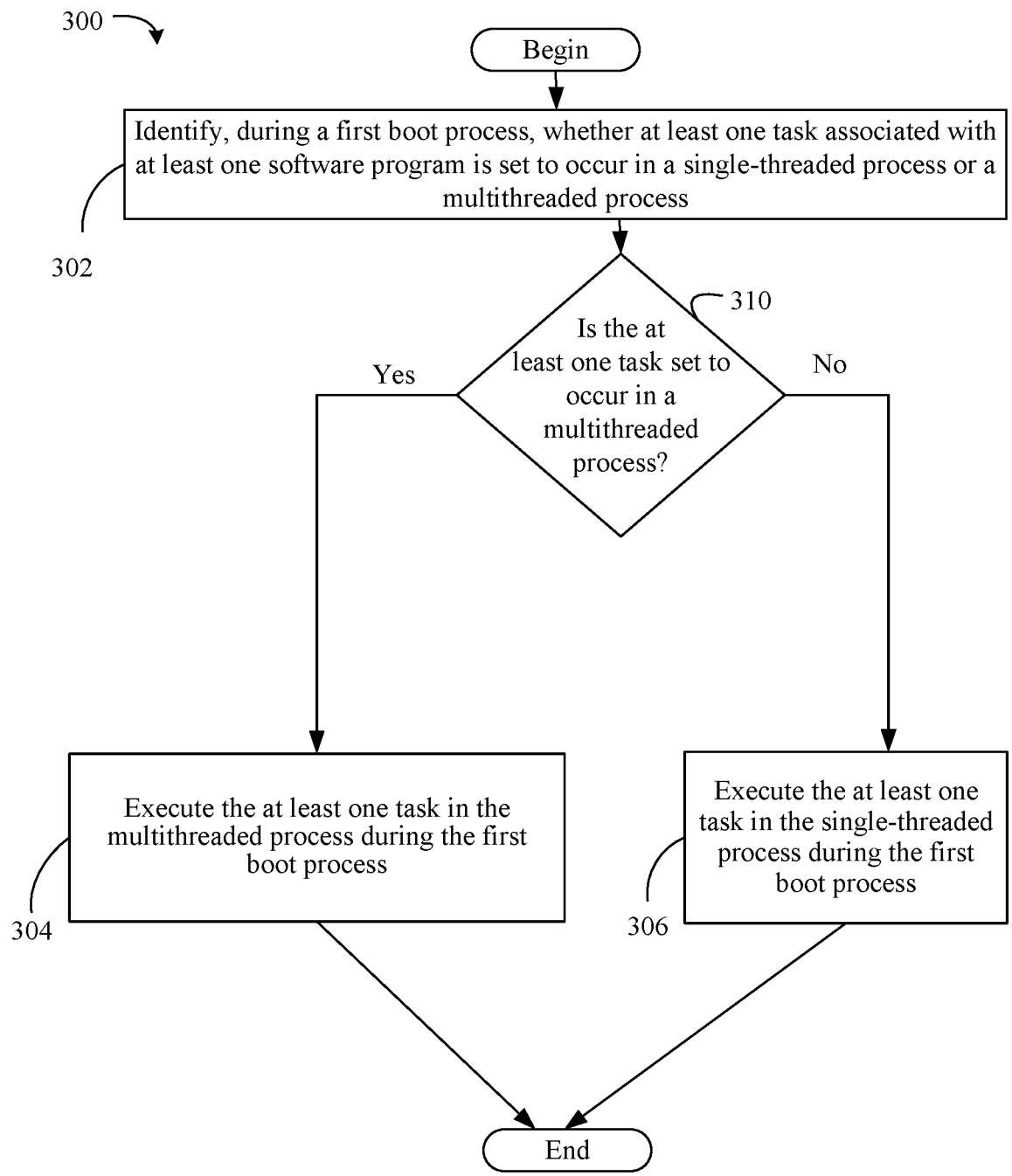
FIG. 2 is a flowchart of an example of a method of a boot process that may execute in a multithreaded environment and/or single-threaded environment according to an embodiment.

FIG. 2 shows a method 300 of conducting a boot process that may execute in a multithreaded environment, single-threaded environment, or alternate between the multi-threaded environment and the single-threaded environment. The method 300 may generally be implemented in a computing system and/or in conjunction with process 100 (FIG. 1). More particularly, the method 300 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Illustrated processing block 302 identifies, during a first boot process, whether at least one task associated with at least one software program is set to occur in a single-threaded process or a multithreaded process. Processing block 310 determines whether the at least task is set to occur in a multithreaded environment (e.g., with reference to an IET). If so (e.g., in response to the at least one task being set to occur in the multithreaded process), illustrated processing block 304 executes the at least one task in the multithreaded process during the first boot process. Illustrated processing block 306, when processing block 310 determines that the at least one task does not execute in the multithreaded environment (e.g., execute in response to the at least one task being set to occur in the single-threaded process), execute the at least one task in the single-threaded process during the first boot process. In some embodiments, the at least one software program is firmware associated with a system-on-chip.

Some embodiments of method 300 include executing, during a first portion of the first boot process, at least one boot operation in a single threaded process, and executing, during a second portion of the first boot process, the at least one task in the multithreaded process. Some embodiments of method 300 include identifying that the at least one task will occur in the multithreaded process during the first boot process, dedicating a first group of processor cores of a host processor of a SoC to the at least one task, and dedicating a second group of processor cores of the host processor to firmware execution associated with hardware devices communicatively connected to the SoC.

Some embodiments of method 300 include determining an amount of time to execute the at least one task during a second boot process, determining that the at least one task will be updated in the multithreaded process based on the amount of time, storing an identification to a data structure that the at least one task will occur in the multithreaded process, accessing, during the first boot process, the data structure to identify that the at least one task will occur in the multithreaded process and executing the at least one task in the multithreaded process during the first boot process. In some embodiments of method 300, the at least one task includes one or more of an update or an execution of the at least one software program.

Figure 3:
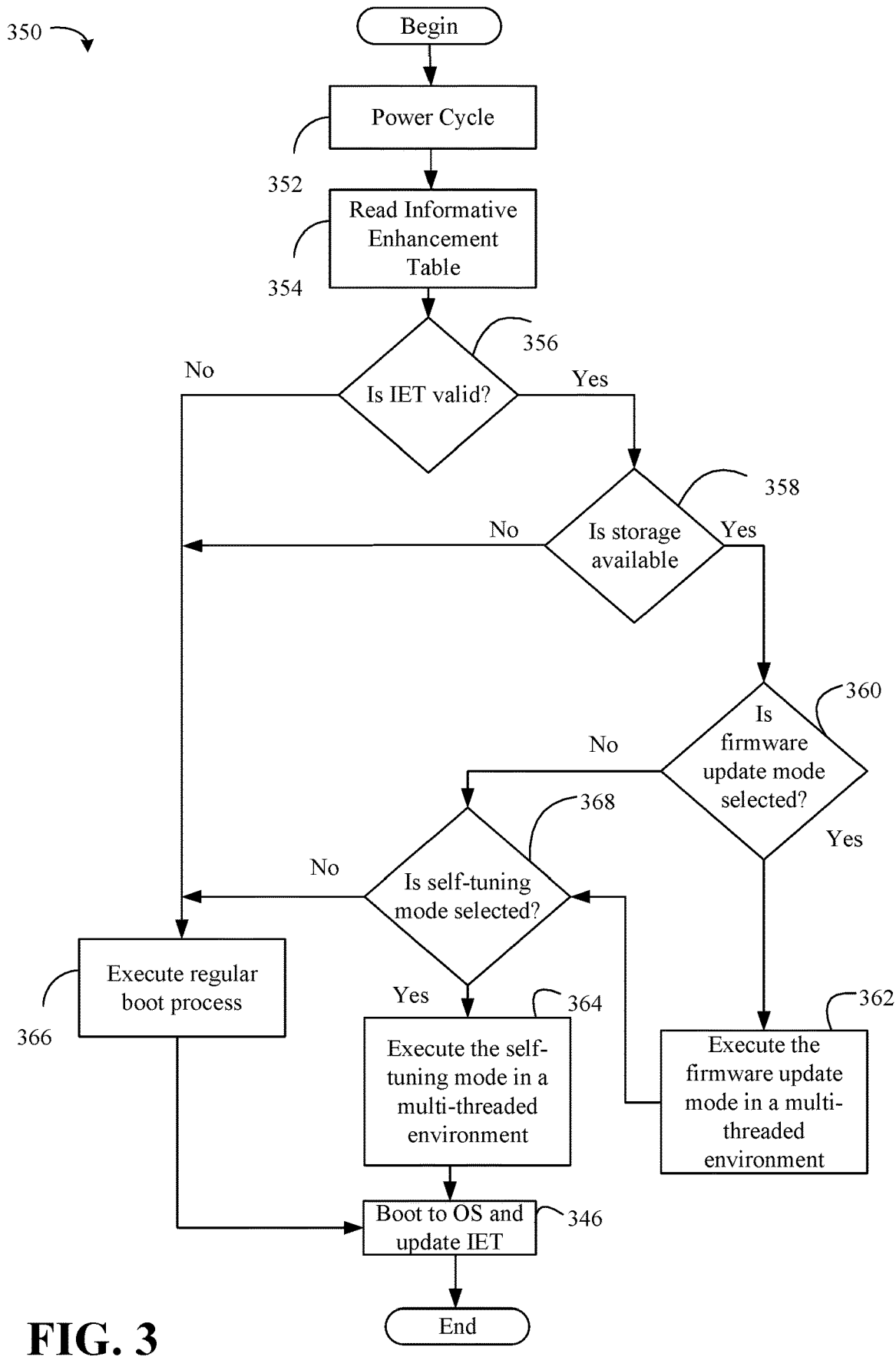
FIG. 3 is a flowchart of an example of a method of an informative boot process that may execute based at least on prior boot data according to an embodiment.

FIG. 3 shows a method 350 of conducting an informative boot process based at least on prior boot data. The method 350 may generally be implemented in a computing system and/or in conjunction with process 100 (FIG. 1) and/or method 300 (FIG. 2), already discussed.

More particularly, the method 350 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Method 350 may be an informed boot process by analysis and understanding of various scenarios to initiate concurrency in the boot process by running singleton tasks which may be executed concurrently with boot processes. A bootloader may operate as a context master to allocate processor cores. For example, in a first portion of method 350, a platform Basic Input/Output System (BIOS) may be equipped with information to identify when to initiate operations in a multithreaded environment.

Thus, some embodiments may execute an entire platform firmware initialization and update in parallel using all available processing cores (e.g., microprocessors). Doing so may significantly reduce firmware update latency and increase the probability that a system does not go out of service due to errors in firmware updates or avoidance of such updates. Some embodiments may further define a new communication flow between the bootloader and SoC firmware (e.g., FSP) using an informative multi-core environment to ensure parallel execution for faster boot process when efficiency is most desired. Thus, some embodiments may include an opportunistic platform boot by predicting when to initiate multithreaded boot to optimize boot time.

Illustrated processing block 352 may include execution of a power cycle (e.g., a system reset) which may cause the bootloader to load. In illustrated processing block 354, control may be passed to the bootloader which may read an IET. For example, the bootloader may use a real-time clock (RTC) and/or CMOS block upper memory (e.g., 128 bits) to create the IET during a previous boot and an informative decision may then by runtime services during a previous execution of the OS. The previous boot may be referred to as a second boot process. The previous boot may have completed to boot a system to OS. Illustrated processing block 352 may power cycle the system at a time when the OS (booted to by the second boot process) may be executing to cause a restart of the system and execute method 350. The method 350 may be referred to as a first boot process. Some embodiments may not initiate a multithread boot unless the process detects specific pattern or opportunity for boot performance latency reductions and performance enhancements.

For example, in order for a boot loader (e.g., a firmware such as BIOS or UEFI) informatively and efficiently make decisions, the bootloader may have a learning feed from operating system (OS) layer to the a runtime service layer (e.g., firmware such as BIOS or UEFI) to receive identifications of efficient multi-threaded operations. For example, the bootloader may perform the platform initialization and boot to OS. If such operations were to execute only in a single threaded environment, the decision and analysis flow may result in a higher latency.

Thus, some embodiments may rely on an OS environment where runtime services (e.g., BIOS or UEFI) may be used to perform some, if not all, analysis and decision-making, and store the analysis and decisions in the IET (e.g., a data structure) to be accessed during a next boot (e.g., a first boot process). The bootloader may access the IET and the information contained in the IET to determine when to execute multithreaded environments.

To facilitate such a decision making and storage process between the OS layer and an underlying layer (e.g., BIOS or UEFI) and between the underlying layer and the OS layer, some embodiments may access a hardware-based memory (e.g., the CMOS memory and/or RTC memory) to store the IET which remain available across the boot cycles and also persist during platform power cycles. During boot, the bootloader may allocate the IET structure into persistent memory. After boot when the OS is loaded, the IET structure may be accessed and modified to include indications of whether multi-thread boot processes are preferable during a following boot cycle. Pseudocode is provided below to implement the IET, where "FEEDCODE" is the table signature:

| Pseudocode One |
|---|
| Typedef struct {<br>    UINT16 FW_Update :1; // set that firmware update is available<br>    UINT16 Self_tuning_boot :1; //Set if detected any boot entries with<br>        execution times above a threshold<br>    UINT16 Reserved :14 // For future use-case like Mode switch for OS<br>        platform (Normal <−> Developer <−> Recovery)<br>} Informative_Task;<br>Typedef struct {<br>    UINT32    Signature; //Valid signature as "FeedC0DE"<br>    Predictive_Task Task; // Define the predictive task to execute<br>        boot-phase in parallel<br>    UNIT16 Buffer[29]; // Buffer to store boot entries for enhancement<br>        by running task in parallel<br>} Informative_Enhancement_Table; |

Illustrated processing block 356 may verify if the IET is valid. For example, processing block 356 may read the signature of the IET to identify whether the signature is valid. If the signature is able to be verified, the IET may be valid. If the signature is invalid, the IET may not be valid.

Thus, if the IET is invalid, then illustrated processing block 366 may execute a regular boot-process without further modifications to avoid switching between a single-threaded mode and a multi-threaded mode (e.g., only execute a single threaded mode, or only in a multi-threaded mode without switching therebetween). If the IET is valid, illustrated processing block 358 determines if sufficient storage is available to execute a modified boot process to execute a multithread boot.

For example, a multi-threaded boot may be executed prior to all memory and storage resources being available (e.g., DRAM resources not available). Some components that may be involved at early boot (e.g., to update microcode, security firmware and power management controller firmware or trusted platform manager) may be executed in a multi-threaded environment for parallel execution. In the absence of dedicated memory to allow all cores being available to perform parallel operations for an informative boot process, some embodiments may provide an alternative to pre-initialized memory. Some embodiments may include hardware modifications to provide sufficient memory for informative boot usage as described in some embodiments. For example, some embodiments may access lower levels of cache (e.g., L4 cache) to reduce latency of memory accesses as compared to DRAM accesses. Some embodiments may further either use package cache available on latest SoC die as a static RAM (SRAM) for firmware access without any further initialization. Some embodiments may include a package cache available as part of lower level cache (LLC) for firmware to use in absence of physical memory by performing memory initialization flow. Thus, some embodiments may be independent of DRAM memory initializations so as to introduce processing cores before DRAM been initialized.

If sufficient storage is unavailable, then processing block 366 executes. In some embodiments, if processing block 358 determines that storage is unavailable (e.g., pre-requisitions to initiate a multithreaded environment are unavailable), the method 350 may again execute processing block 354 again (e.g., return to this analysis and re-execute the process until memory is available).

Otherwise, illustrated processing block 360 may again reference the IET to detect if a firmware update mode is selected in the IET. In detail, the IET may include an identification (e.g., from a previous boot of the OS) whether a prediction been set that corresponds to the firmware update mode. For example, during a previous execution of the OS, the OS may have determined that a firmware of a peripheral, SoC component or other device is to be updated. A runtime firmware (e.g., BIOS runtime or UEFI runtime) may set a firmware update request bit in the IET to indicate that the firmware of the peripheral or other device is to be updated during a next boot cycle. If the firmware update request bit is set in the JET, then processing block 362 executes the firmware update mode in a multi-threaded environment.

Otherwise, illustrated processing block 368 determines if a self-tuning mode is selected. Processing block 368 may do so with reference to the IET (e.g., execute the self-tuning mode if the IET contains an indication that the self-tuning mode is to be engaged). If so, illustrated processing block 364 executes the self-tuning mode in a multi-threaded environment to selectively execute some firmware tasks in parallel. The self-tuning mode may be set to execute by the IET if boot processes (e.g., firmware executions and initializations of hardware associated with the firmware) have a latency above a threshold as identified during the previous boot process.

For example, after a platform boots to OS, runtime services may analyze the boot performance data to make informative calls to enhance the platform boot time. During the boot process, timings of various firmware may be recorded as firmware entries. Post boot, if any boot performance of the firmware entry has a recorded execution time beyond a threshold (e.g., ~100 ms) then the firmware of the firmware entry may qualify for informative boot enhancement (e.g., the self-tuning mode may be set to execute the firmware in parallel during following boot cycles). Firmware that is identified as having timings above the threshold may be recoded (post-boot) in the IET. Processing block 368 may access the IET to read and identify the firmware(s) that is be executed in parallel during the boot process based on previous latencies being above the threshold.

If the self-tuning mode is not selected, processing block 366 executes a regular boot process. It is worthwhile to note that processing block 366 may execute updates to firmware. Such updates by processing block 366 may be omitted when processing block 362 executes since processing block 362 has already updated the firmware.

If the self-tuning mode is selected, processing block 364 executes the self-tuning mode in a multi-threaded environment. Illustrated processing 346 boots to OS and updates the IET with runtime services. Such aspects are described above. Some embodiments may provide an enhanced and greater utilization of CPU resources (cores) in a boot block. Some embodiments may execute parallel device initializations and/or FW update blocks shall to reduce boot times and support faster boot processes.

Additionally, some embodiments of method 350 may be executed during mode switching such as when a user switches from "normal" mode to "developer" or "recovery" mode, executing "power-wash" to restore the factory settings where underlying BIOS has to initialize additional debug controller (XHCI, XDCI, DAM) or retrain memory controller within the fixed boot budget. Thus, processing block 352 may be replaced by switching modes, power-washes, etc. In other examples the entire boot may take place in a single threaded environment running only over Boot Strap Processor (BSP) (e.g., even after multicores become available at ~650 ms since CPU).

Figure 4:
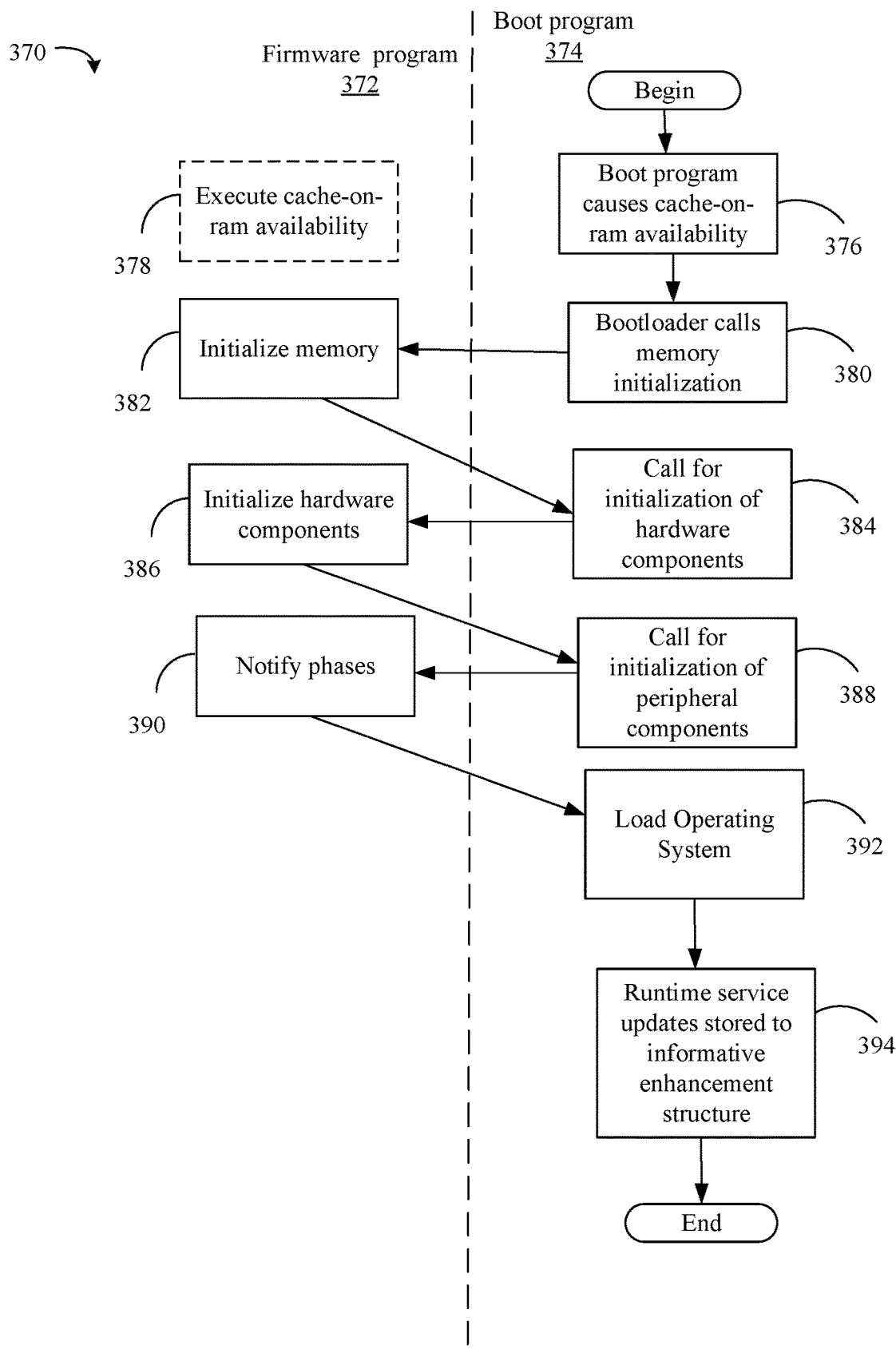
FIG. 4 is a flowchart of an example of a method of an executing a regular boot process according to an embodiment.

FIG. 4 shows a method 370 of executing a regular boot process according to some embodiments. The method 370 may generally be substituted for processing block 366 (FIG. 3). More particularly, the method 370 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

As illustrated firmware initialization and update firmware program 372 (e.g., a firmware support package program and/or update program) and the boot program 374 may be responsible for booting the computing device and actions are listed underneath the actor who executes the action. For example, the firmware program 372 may be responsible for updates to SoC firmware and initializing SoC hardware components, such as silicon components including processors, memory controllers, chipsets and certain bus interfaces. The boot program 374 may initialize and update platform firmware (e.g., non-SoC devices), configure pin multiplexing and pin settings (e.g., slew rate, voltage, and pull-up/pull-down), configuring clocks in a clock tree, bringing up and calibrating the memory such as SDRAM, RAM, ROM, etc., initializing flash memory, loading an OS from memory (e.g., flash memory), and passing control to the OS.

Illustrated processing block 376 includes the boot program 374 causing cache-on-ram availability. Optionally, firmware program 372 may execute processing block 378 to execute cache-on-ram availability. It will be understood that in some embodiments, processing block 378 may execute and processing block 376 may be bypassed. Illustrated processing block 380 includes the bootloader calling memory initialization (e.g., DRAM). Illustrated processing block 382 initializes memory. Illustrated processing block 384 calls for initialization of hardware components. In response, illustrated processing block 386 initializes hardware components. Illustrated processing block 388 calls for notify phases and may further enumerate Peripheral Component Interconnect (PCI). In response, illustrated processing block 390 notifies phases (e.g., end of firmware, ready to boot, post PCI enumeration). Illustrated processing block 392 loads an operating system. Illustrated processing block 394 updates runtime services to an IET as described herein based on latencies identified during the method 370 and/or firmware updates.

It is worthwhile to note that in some embodiments, the firmware program 372 may also update firmware as needed. For example, if processing block 362 (FIG. 3) has been bypassed, firmware program 372 may update firmware as needed. If processing block 362 (FIG. 3) has executed, firmware updates may be bypassed.

Figure 5:
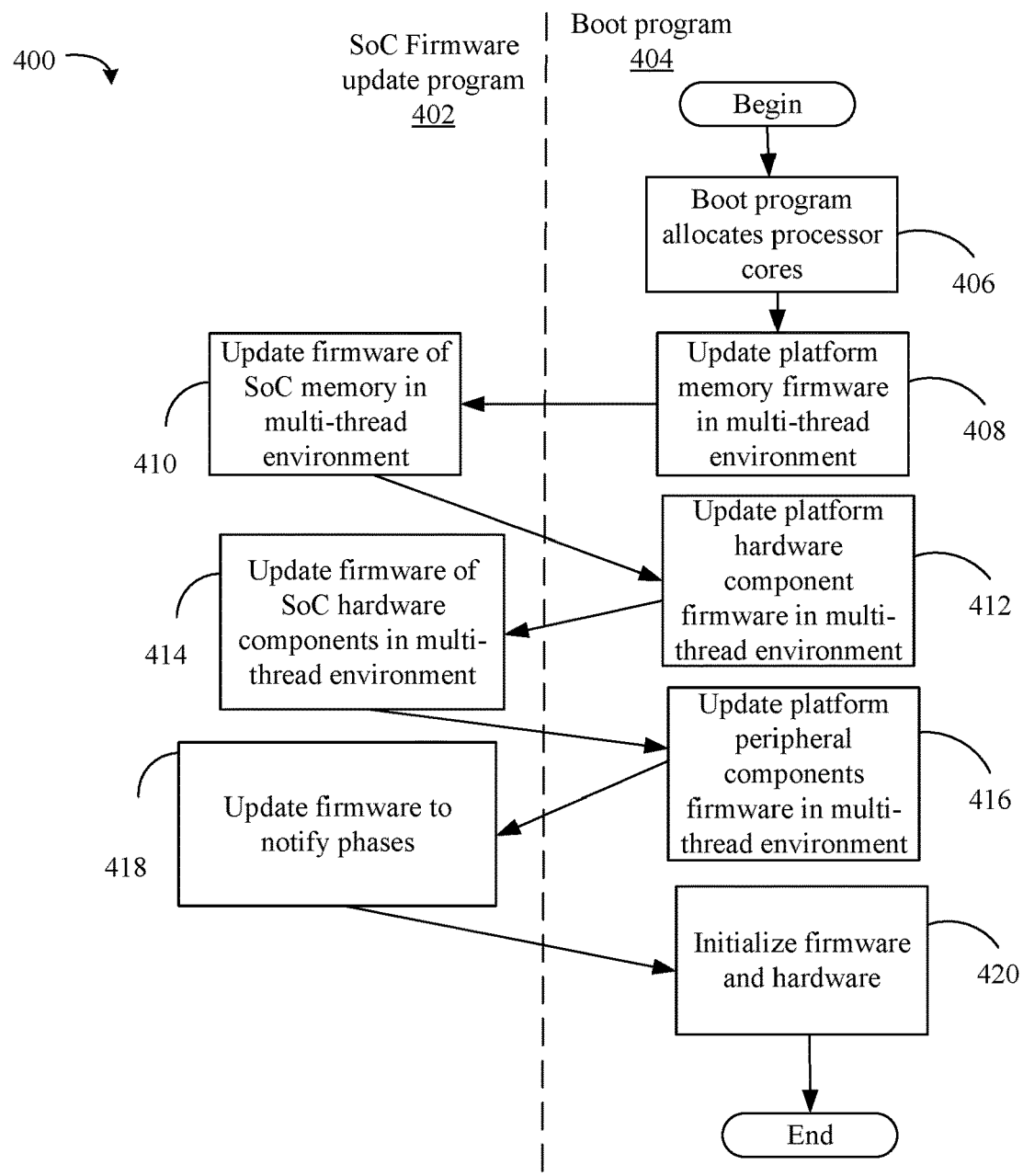
FIG. 5 is a flowchart of an example of a method of an executing a firmware update mode associated boot process according to an embodiment.

FIG. 5 shows a method 400 of executing a firmware update mode associated boot process according to some embodiments. The method 400 may generally be substituted for processing block 360 (FIG. 3). More particularly, the method 400 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

As illustrated, a SoC firmware update program 402 (e.g., a firmware support package program and/or update program for SoC devices) and the boot program 404 may be responsible for booting the computing device and actions are listed underneath the actor who executes the action. For example, the SoC firmware update program 402 may be responsible for updates to SoC firmware for silicon components including processors, memory controllers, chipsets and certain bus interfaces. The boot program 404 may configure other platform devices (e.g., non-SoC devices) such as pin multiplexing and pin settings (e.g., slew rate, voltage, and pull-up/pull-down), configuring clocks in a clock tree, bringing up and calibrating the memory such as SDRAM, RAM, ROM, etc., initializing flash memory, loading an OS from memory (e.g., flash memory), and passing control to the OS.

As discussed below, method 400 may relate to informative task scheduling and resource allocation to (e.g., CPU resources, etc.) to reduce the boot time. For example, method 400 may be an informative Multithreaded BIOS embodiment.

Initially, the boot program 404 (e.g., a bootloader) executes illustrated processing block 406 to allocate processor cores. For example, the boot program 404 may allocate each processor core of a host processor to the boot program 404 or the SoC firmware update program 402. In some embodiments, the boot program 404 may identify a number of cores to efficiently execute operations of the boot program 404 and the SoC firmware update program 402 in parallel. The boot program 404 may further set certain fields (e.g., Updatable Product Data) to allow the boot program 404 to execute platform firmware updates over at least one processor (e.g., boot strap processor) with silicon firmware updates being executed on other processors (e.g., application processors).

Illustrated processing block 408 updates platform memory firmware in a multi-thread environment. Illustrated processing block 410 updates firmware of SoC memory in a multi-thread environment. Illustrated processing block 412 updates platform hardware components firmware in a multi-thread environment. Illustrated processing block 414 updates firmware of SoC hardware components in a multi-thread environment. Illustrated processing block 416 updates firmware of platform peripheral components in a multi-thread environment. Illustrated processing block 418 updates firmware to notify phases (e.g., end of firmware, ready to boot, post PCI enumeration). Processing block 420 may initialize the updated firmware and associated hardware. It will be understood that one or more of the aforementioned processing blocks 406, 408, 410, 412, 414, 416, 418 may be omitted if the corresponding firmware needs no updates.

In some embodiments, method 400 may boot to OS. After a period of time (e.g., ~20 seconds after login to OS user-interface and/or console), runtime services may auto trigger to reset the PET table indications that firmware updates are desired (e.g., reset "FW_Update" variable). Thereafter, the IET table may be set should firmware updates be desired during a following boot cycle.

Figure 6:
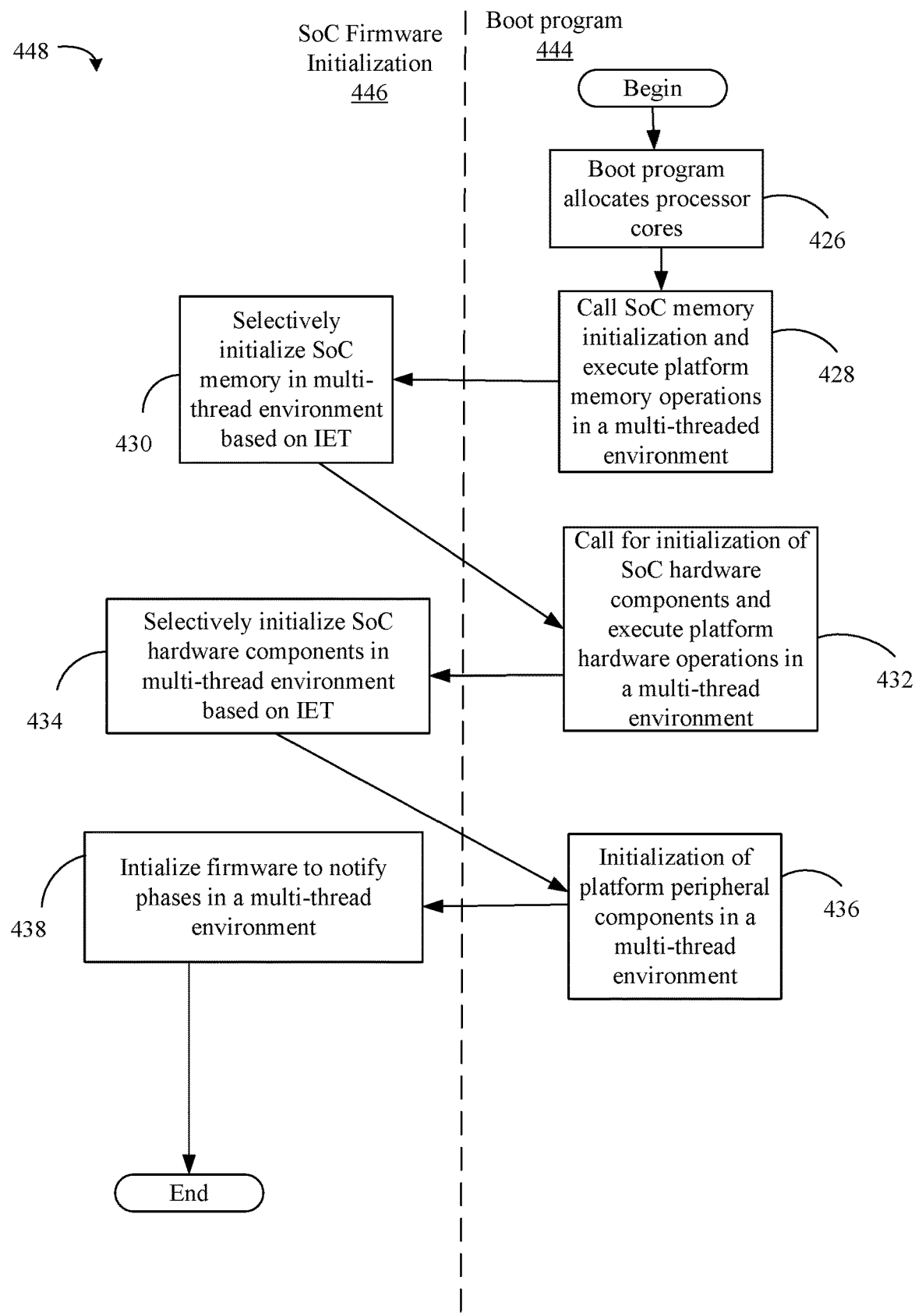
FIG. 6 is a flowchart of an example of a method of an executing a self-tuning associated boot process according to an embodiment.

FIG. 6 shows a method 448 of executing a self-tuning associated boot process according to some embodiments. The method 448 may generally be substituted for processing block 368 (FIG. 3), already discussed. More particularly, the method 448 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

As illustrated two different actors may boot a computing device. For example, SoC firmware initialization 446 (e.g., a firmware support package program and/or update program) and the boot program 444 may be responsible for booting the computing device. Actions are listed underneath the actor who executes the action.

Some embodiments relate to a self-tuning firmware booting enhancement. For example, after first platform boot to OS, runtime services (e.g., BIOS) may execute a boot performance analysis to identify if certain boot entries may execute in parallel to reduce the platform boot time. Such a boot performance analysis may be self-tuning or self-learning and may include predefined training parameters (e.g., "reduce boot time for entries having >100 ms of execution time"). Such training data may be retrieved as part of an OS upgradable script and enable modification if boot time enhancement goals are more aggressive for certain platforms (e.g., internet-of-things compared to client devices).

For example, a runtime service may create a boot entry list of firmware programs that are to be enhanced (e.g., write to unique entries as part of IET table such as a "Buffer [ ]" data variable) and set a bit (e.g., a "Self_Tuning_Boot" bit) indicating that a firmware programs are to be executed in parallel. The bit may communicate to a boot phase that the boot entry list is available so that the boot process enters the self-turning mode to reads the boot entry list. For example, processing block 368 (FIG. 3) and/or method 448 may read the "Self_Tuning_Boot" bit of the IET to determine whether the self-turning mode is selected.

Thus, during a next consecutive boot, the boot phase may extract the IET table after ensuring that the IET table is valid, read the "Self_Tuning_Boot" bit to determine that the firmware is to be enhanced by executing in parallel and read the boot entry list to identify the list of firmware. Such a process is described below and is responsive that the IET table includes an indication that firmware is to be executed in a parallel.

Similar to above as described with respect to FIG. 5, the boot program 444 may execute illustrated processing block 426 to allocate all possible cores or a subset of the cores between SoC firmware initialization 446 and boot program 444. Some embodiments may read through boot enhancement entry list (Buffer [0 . . . n]) of the IET and determine whether each firmware is associated with the boot program 444 or SoC to be executed by the SoC firmware initialization 446. Based on the above decision, the boot program 444 may assign the multicore splits between boot program 444 and the SoC firmware initialization 446 so that each of the boot program 444 and the SoC firmware initialization 446 may effectively execute the firmware. For example, if boot entries for enhancement only correspond to the SoC firmware initialization 446, then the boot program 444 (e.g., a bootloader) may assign all cores (including BSP) to SoC firmware initialization 446 for parallel execution. Conversely, if boot entries for enhancement only correspond to boot program 444, then all cores may be assigned to the boot program 444. Thus, the boot program 444 may proportionally assign the cores to SoC firmware initialization 446 and the boot program 444 based on workloads. The boot program 444 and SoC firmware initialization 446 may continue to execute in parallel.

Illustrated processing block 428 includes calling SoC memory initialization and executing platform memory operations in a multithreaded environment. While not illustrated, platform memory initializations that are not identified in the IET for multi-thread execution may be executed in a single-thread environment. Illustrated processing block 430 selectively initializes SoC memory in multi-thread environment based on the IET. While not illustrated, SoC memory that is not identified in the IET for multi-thread execution may be executed in a single-thread environment.

Illustrated processing block 432 calls for initialization of hardware components and execute platform hardware operations (e.g., initializations, etc.). While not illustrated, platform hardware initializations that are not identified in the IET for multi-thread execution may be executed in a single-thread environment. Illustrated processing block 434 selectively initializes SoC hardware components in a multi-thread environment based on the IET. While not illustrated, SoC hardware components that are not identified in the IET for multi-thread execution may be executed in a single-thread environment. Illustrated processing block 436 initializes platform peripheral components. While not illustrated, platform peripheral component initializations that are not identified in the IET for multi-thread execution may be executed in a single-thread environment. Illustrated processing block 438 selectively initializes firmware to notify phases in a multi-thread environment. While not illustrated, firmware to phases that are not identified in the IET for multi-thread execution may be executed in a single-thread environment.

Some embodiments may also load the OS. Some embodiments also store runtime service updates to the IET. For example, at the end of firmware initializations and after booting to OS, the runtime service may again progress into analysis of the boot performance data with informative boot and store firmware to be updated in parallel to the IET so that some devices (e.g., "Hybrid Storage", "eMMC initialization", etc.) are running in parallel to improve the platform response time.

It is worthwhile to note that firmware operations and/or initializations that are not identified in the IET as being executable in the multi-threaded environment may execute in a single thread environment prior to or after method 448. Furthermore, in some embodiments, method 400 (FIG. 5) may complete execution and method 448 may execute directly thereafter.

Figure 7:
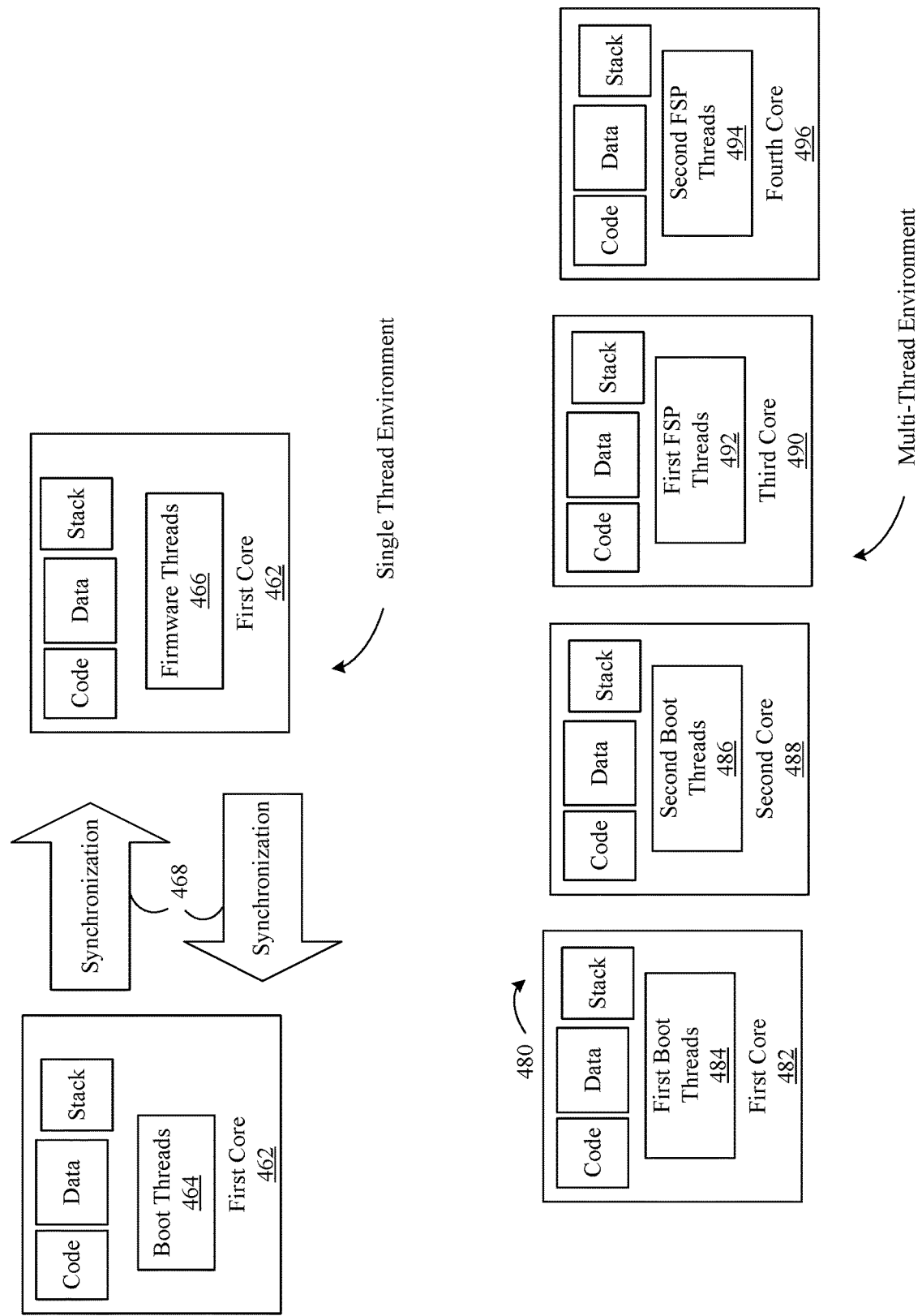
FIG. 7 is a schematic diagram of an example of a decoupled communication flow according to an embodiment.

Turning now to FIG. 7, a decoupled communication flow 480 may decouple unidirectional communication flow between bootloader and firmware. The decoupled communication flow 480 may generally be implemented in a computing system and/or in conjunction with process 100 (FIG. 1), method 300 (FIG. 2), method 350 (FIG. 3), method 370 (FIG. 4), method 400 (FIG. 5) and/or method 448 (FIG. 6), already discussed.

For example, a single-threaded environment may be implemented on a first core 462. The first core 462 may execute boot threads 464. Thereafter, the first core 462 may execute firmware threads 466. The firmware threads 466 (e.g., FSP) and boot threads 464 may rely on synchronization 468 to pass control between boot thread 464 and firmware threads 466.

In contrast, the multi-threaded environment may not need such synchronization to pass control between the first core 482, second core 488, third core 490 and fourth core 496. The first core 482 may execute first boot threads 484 and the second core 488 may execute second boot threads 486. First boot threads 484 and second boot threads 486 may be associated with boot processes such as device platform initiations. The third core 490 and fourth core 496 may respectively execute the first FSP threads 492 and second FSP threads 494 to update and initiate SoC associated firmware.

For example, some embodiments may provide options for bootloader and firmware to execute tasks in parallel in a thread safe mechanism (e.g., without excessive resources for core synchronization between bootloader and firmware) using dedicated data structures such as a UPD. For example, some embodiments as described herein implement a high level synchronization construct as "monitor" type inside firmware to allocate tasks inside the firmware by multiple cores that remain in synchronization to avoid any duplicate access. The monitor construct ensures that only one processor at a time may be given access to a task. Some embodiments as described herein use a special instruction (e.g., MONITOR/MWAIT instruction) to reduce latency between core operational and wake time from idle. Some embodiments of the firmware as described herein use semaphore to access potential shared resources inside FSP and/or bootloader.

Some embodiments relate to an underlying mechanism for core synchronization. Firmware (e.g., BIOS) may split a single task like device initializations or updates into multiple subtasks and assign the subtasks over multiple cores for running in parallel. Thus, some embodiments may employ a semaphore for providing a low latency, efficient and effective mechanism for core synchronization. Some embodiments may "monitor" synchronization construct for core synchronization inside the firmware 504 (e.g., a FSP) to ensure a task is only attempted and executed by one core at a time.

Some embodiments may further ensure that other cores are not in starvation and provide a deadlock free solution by imposing a restriction that a core may pick up a task if both the task and the core are available. For example, some embodiments may implement possible states to identify a task status inside shared data variable, and this same way a core may identify if a task is available for execution.

Some embodiments may include a data structure to implement the above, which is "enum {waiting, signal, complete} state[n] [where 'n' is task count]." Some embodiments may also include an arbiter that may assign a task to an available core only if the associated state of the core corresponds to a "waiting" state. When the monitor hardware is triggered, if for example the mwait acts as a nop, and execution continues from the next instructions, will mark that task status by an indication (e.g., "signal"). Upon completion of that task, the core will update a task state with an indication of completion (e.g., "complete").

A possible write into a specified core's address range (e.g., a MONITOR address) may cause that core to access a monitor region to identify and execute the task, and that results into state transition of assigned task. Upon completion of that task core will update task state to "complete" before executing a wait (e.g., MWAIT) instruction. The following pseudocode may illustrate a typical example of the MONITOR/MWAIT pair:

---

Pseudocode 2

---

```
EAX = Logical Address (Trigger)
ECX = 0 (*Hints *)
EDX = 0 (* Hints *)
TASK.STATE[i] = "waiting"
IF (!trigger_store_happened) {
```

Pseudocode 2

```
TASK.STATE[i] = "signal"
MONITOR EAX, ECX, EDX
TASK.STATE[i] = "complete"
MWAIT EAX, ECX
}
```

A task may only consider completed when all its subtasks state is moved into "complete" state.

Shared Data is described in further detail below. Some embodiments may include a data region where Inter Processor Communication (IPC) variables may be stored to avoid synchronization issues, and that is accessible by first core 482, second core 488, third core 490 and fourth core 496. An example of a shared data for this monitor before starting multiple core operation is provided:

TABLE I

| Task | 0 | 1 | 2 | n |
|---|---|---|---|---|
| State | Waiting | Waiting | Waiting | Waiting |

In some embodiments, available cores (e.g., CPU cores) associated with execution of the SoC firmware, such as third core 490 and fourth core 496, may be identified by a data structure identification such as a UPD. Third core 490 and fourth core 496 may obtain a task, progress towards a task end and update the task status. For example, assume the third core 490 is running Task 0 as first FSP threads 492, and fourth core 496 has nearly completed execution of second FSP threads 494 to complete task 1. Thus, fourth core 496 may be approaching towards a new task. The following may be a snapshot of shared data variable at that point.

TABLE II

| Task | 0 | 1 | 2 | n |
|---|---|---|---|---|
| State | signal | completed | Waiting | Waiting |

An initialization code may be provided. For example, before starting execution of the operation, all task states may be programmed to default value as "waiting." The above Table I and II may be stored in a memory for access.

Figure 8:
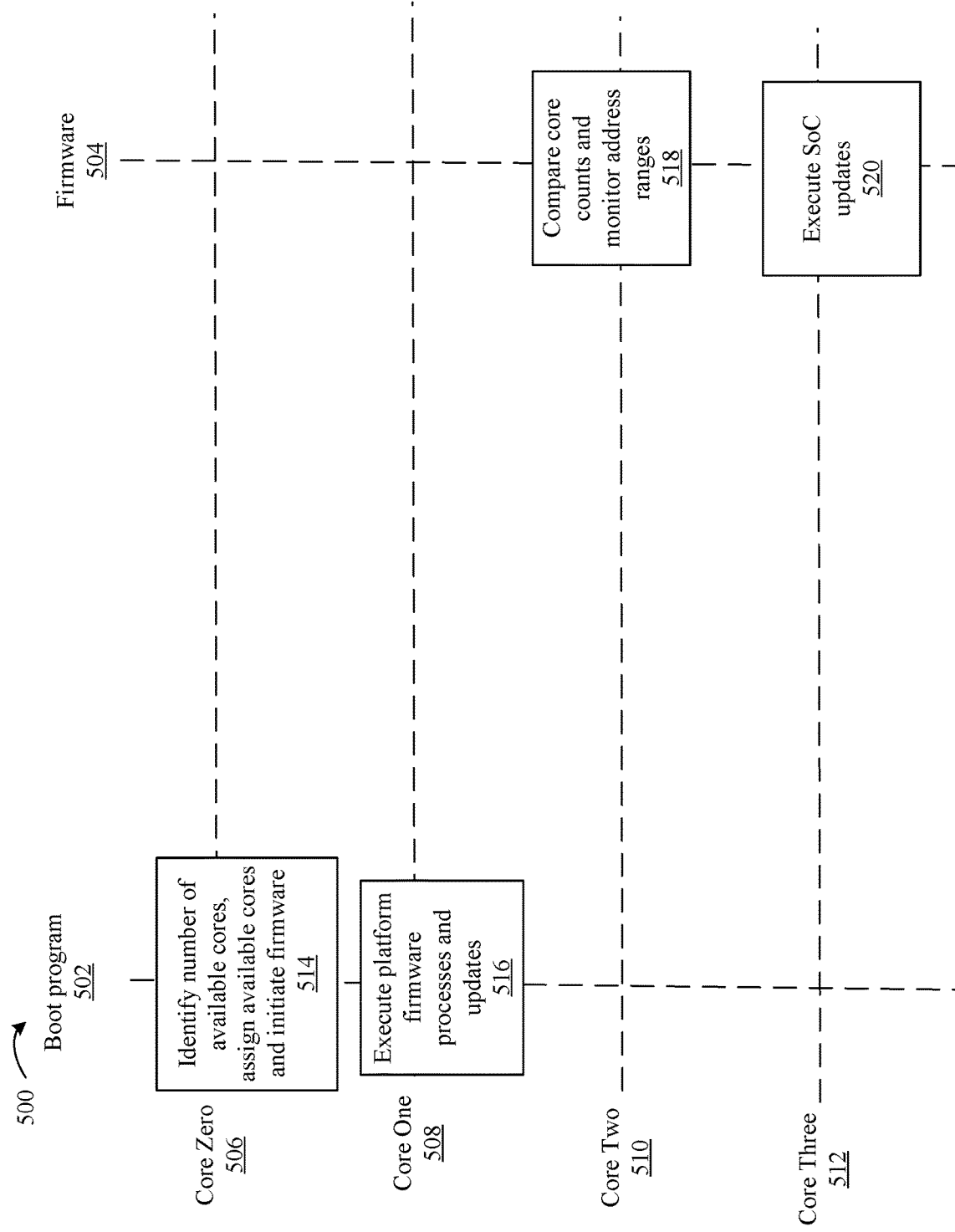
FIG. 8 is a process of an example of a communication process according to an embodiment.

Turning now to FIG. 8, some embodiments may relate to a communication method 500 for passing core information between a boot program 502 (e.g., bootloader) and firmware 504 (e.g., FSP) as illustrated in FIG. 8. The method 500 may generally be implemented in a computing system and/or in conjunction with process 100 (FIG. 1), method 300 (FIG. 2), method 350 (FIG. 3), method 370 (FIG. 4), method 400 (FIG. 5), method 448 (FIG. 6), and/or method 400 (FIG. 7), already discussed.

FIG. 8 may illustrate a handling of an informative firmware update between boot program 502 and firmware 504. For example, the boot program 502 may identify the number of available cores, assign available cores and initiate firmware 514. Core zero 506 may correspond to a BSP and assign core zero 506 and core one 508 to the boot program 502, and core two 510 and core three 512 to the firmware 504.

The boot program 502 may execute platform firmware processes and updates 516 on core one 508, and additionally may execute firmware processes and updates on core zero 506. Firmware 504 may compare core counts and monitor address ranges 518 to determine and assign tasks and execute SoC updates 520. In some embodiments, the firmware 504 may also compare core counts to identify that a multithreaded core environment is engaged and monitor an address range to monitor write back stores for the processor to start execution based on processor identifications.

For example, the boot program 502 may calculate the number of active core available before initiating parallel execution between boot program 502 and the firmware 504. The boot program 502 splits the active cores between the boot program 502 and firmware 504 related operations. In order to perform a thread safe mechanism between boot program 502 and firmware 504 during parallel execution, some embodiments may employ a policy that the boot program 502 and firmware 504 inform each other about a number of cores being respectively utilized. The boot program 502 may reallocate core zero 506, core one 508, core two 510 and core three 512 accordingly. For example, a "multithreaded firmware blob" may include newly added UPDs for firmware headers for unique identification of cores responsible for parallel execution inside firmware.

Some embodiments may include a parameter (e.g., a UPD parameter such as MTCpuCoreCount) filled by the boot program 502 to tell the firmware 504 about a number of cores that are available for firmware 504 usage in a thread safe manner. The default value may be 1 and corresponds to a single threaded operation. Some embodiments may include an array (e.g., UPD parameter such as MTCpuAPICIds[n]) for unique identification of designated cores for firmware 504 to utilize. In the above example, "n" may be a CPU index and value at index 'n' may be Advanced Programmable Interrupt Controller (APIC) ID that identifies a particular core of core zero 506, core one 508, core two 510 and core three 512. The boot program 502 may fill this array with corresponding CPU cores (e.g., APIC IDs) assigned for firmware 504 to use, with a default value being 0. Default UPD variable definitions inside FSP may be illustrated below:

Pseudocode 3

```
# !BSF NAME:{core count for FSP usage } TYPE:{EditNum, HEX, (0x00,0xFF)}
# !BSF HELP:{bootloader to tell FSP about how many cores are available for FSP usage in thread safe manner, Default value would be 1, identify as single threaded operation.}
  gPlatformFspPkgTokenSpaceGuid.MTCpuCoreCount        | * | 0x01 | 0x01
# !BSF NAME:{unique identification of designated cores for FSPs consumption}        TYPE:{EditNum,        HEX, (0x00,0xFFFFFFFFFFFFFFFFFFFFFFFF)}
# !BSF HELP:{ APIC ID for each CPU index. Bootloader will fill this
```

Pseudocode 3

UPD with corresponding CPU cores APIC ID assigned for FSP to use.
Default value would be 0}
    gPlatformFspPkgTokenSpaceGuid.MTCpuAPICIds      | * | 0x0C |
{0x00, 0x00, 0x00, 0x00, 0x00, 0x00, 0x00, 0x00, 0x00, 0x00, 0x00, 0x00
}

For example, consider a platform design with quad cores. Thus, an active CPU core count at bootloader side would be four. The boot program 502 may allocate two cores of core zero 506, core one 508, core two 510 and core three 512 for its own execution and assign the remaining two cores core zero 506, core one 508, core two 510 and core three 512 for firmware 504 consumption. Assigning required FSP-M UPDs to initiate parallel FSP execution may be provided by the following pseudocode: "MTCpuCoreCount=2, MTCpuAPICIds[2]=2 and MTCpuAPICIds[3]=3."

The following is an example of an overridden UPD variable definitions pseudocode:

Pseudocode 4

!BSF NAME:{core count for FSP usage } TYPE:{EditNum, HEX,
(0x00,xFF)}
  # !BSF HELP:{bootloader to tell FSP about how many cores are available for
FSP usage in thread safe manner, Default value would be 1, identify as single
threaded operation.}
    gPlatformFspPkgTokenSpaceGuid.MTCpuCoreCount      | * | 0x01 | 0x02
  # !BSF NAME:{unique identification of designated cores for FSPs
consumption} TYPE:{EditNum, HEX,
(0x00,0xFFFFFFFFFFFFFFFFFFFFFFFF)}
  # !BSF HELP:{ APIC ID for each CPU index. Bootloader will fill this UPD
with corresponding CPU cores APIC ID assigned for FSP to use. Default value
would be 0}
    gPlatformFspPkgTokenSpaceGuid.MTCpuAPICIds      | * | 0x0C | { 0x00,
0x00, 0x02, 0x03, 0x00, 0x00, 0x00, 0x00, 0x00, 0x00, 0x00, 0x00 }

Assigning those UPDs once during an initial stage itself is enough to perform multithreaded firmware execution in parallel to bootloader during entire firmware 504 life span (e.g., FSP-M, FSP-S and corresponding NotifyPhase as well).

Some embodiments may employ a continuous execution using multicore environment to track the control transfers between boot program 502 and firmware 504, a shared data variable (e.g., named "bootloader core count") to identify if firmware 504 and boot program 502 are executing a parallel operation. When active platform core counts are the same with the shared data variable "bootloader core count" then no SoC firmware executions are running in parallel. Otherwise the boot program 502 and firmware 504 are performing concurrent operations.

The boot program 502 may own the BSP core which is core zero 506, and therefore core zero 506 may always monitor the shared data variable in order to take control of cores when no firmware 504 execution are executing. Reallocated cores may update "bootloader core count" at entry and exit of the core.

The boot program 502 may continue to perform its regular operation like locating firmware 504 (e.g., FSP-M/S), updating the UPDs based on SoC and mainboard configuration on one core. While other cores may handle the platform device firmware update or optimization of bootloader specific boot entries. Upon calling a firmware (e.g., FSP-M/S) entry point by the bootloader processor, the firmware 504 (e.g., FSP-M) now has all required information from the boot program 502 along with dedicated CPU resources and memory to create a parallel execution environment inside the firmware 504.

The firmware 504 may check that the MTCpuCoreCount UPD has more than 1 core to establish parallel communication. If so, then the firmware 504 may create a MONITOR address range for each core (by comparing an identifier such as APIC ID of available CPU cores against APIC ID assigned in MTCpuAPICIds[n] UPD) such that operating cores has a minimum latency while waking up from idle stage by issuing an execution command. After completion of an assigned task, cores may wait to use MWAIT for a next write into the MONITOR address range for next sets of operations.

Cores executing operations for the firmware 504 may read default UPDs of core two 510 and core three 512 assigned to the firmware 504 and create policy configuration blocks with additional bootloader policy overrides. Core two 510 and core three 512 inside firmware 504 may handle the execution of SoC specific components like input/output modules, M-PHY associated components, integrated sensor hubs, etc. in multithreaded environment.

Some embodiments may create shared data with those subtask and state of those task by default as "waiting" to effectively divide tasks. Moreover, some embodiments may write to dedicated core MONITOR addresses with subtask function ( ) then the monitor HW is triggered in the core. The wait instruction (e.g., mwait) may be implemented and execution continues from the next instructions and execute that task. Respective core two 510 and core three 512 inside firmware 504 may execute those tasks and update a shared data variable. This may continue until all tasks are migrated into "completion" state. Core zero 506 and core one 508 execute under bootloaders control and may continue to execute in parallel to core two 510 and core three 512.

Some embodiments include a verified boot flow, trusted platform module initialization and verifying embedded controller read/write (EC RW) region and jump into the EC RW region. Device firmware updates (e.g., SoC firmware) may be handled using application processors. The boot program 502 may check shared variable data "bootloader core count" to know if the firmware 504 is done and released all cores for boot program 502 usage.

Some embodiments may check if a platform has a reset request. If so, the control transfers to a reset vector. Moreover, in some embodiments, the boot program 502 may run operations in parallel on all possible active cores to ensure execution of remaining operations to boot to OS.

Figure 9:
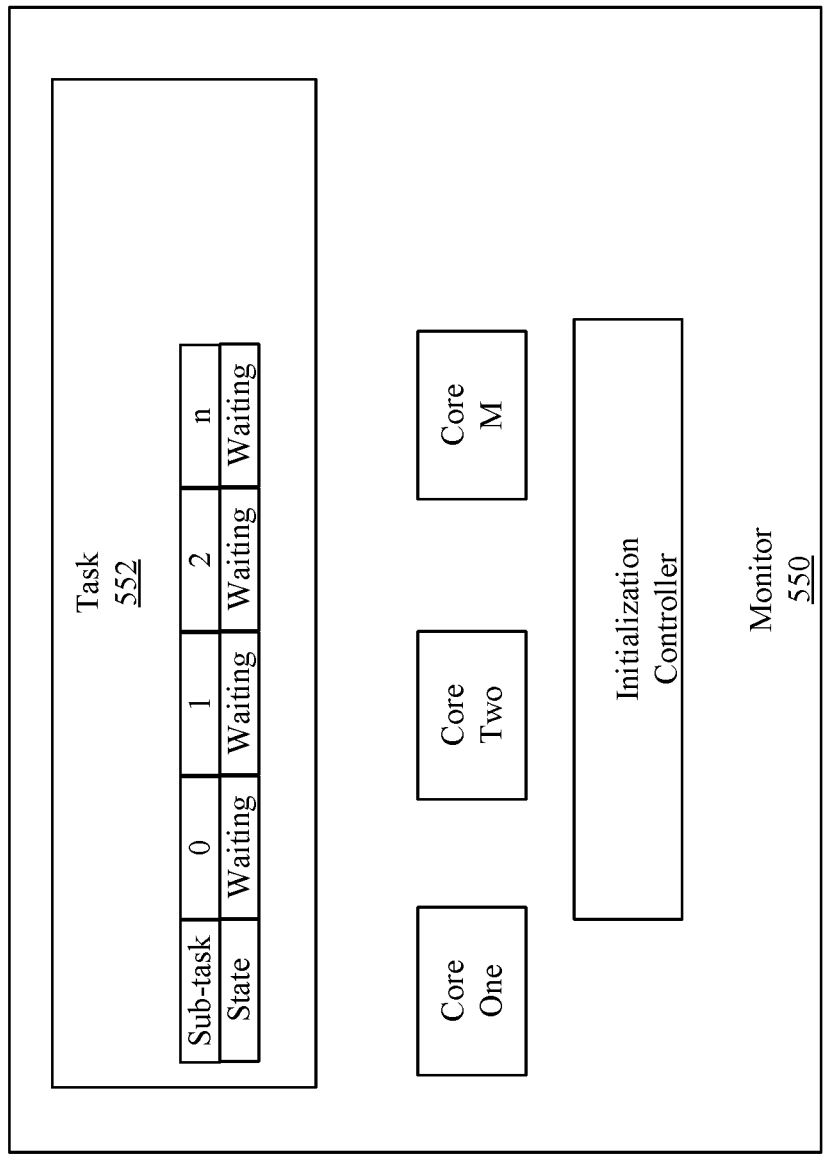
FIG. 9 is a schematic diagram of an example of a monitor according to an embodiment.

FIG. 9 illustrates a monitor 550. The monitor 550 may generally be implemented in a computing system and/or in conjunction with process 100 (FIG. 1), method 300 (FIG. 2), method 350 (FIG. 3), method 370 (FIG. 4), method 400 (FIG. 5), method 448 (FIG. 6), method 400 (FIG. 7), and/or method 500 (FIG. 8), already discussed.

A series of tasks 552 and sub-tasks may initially be set to waiting (no core may be executing the tasks). The monitor 550 may include core one-core M, although core one-core M may be separate from the monitor 550. Tasks 552 may be assigned to the core one-core M. An initialization code may initialize the monitor 550.

Figure 10:
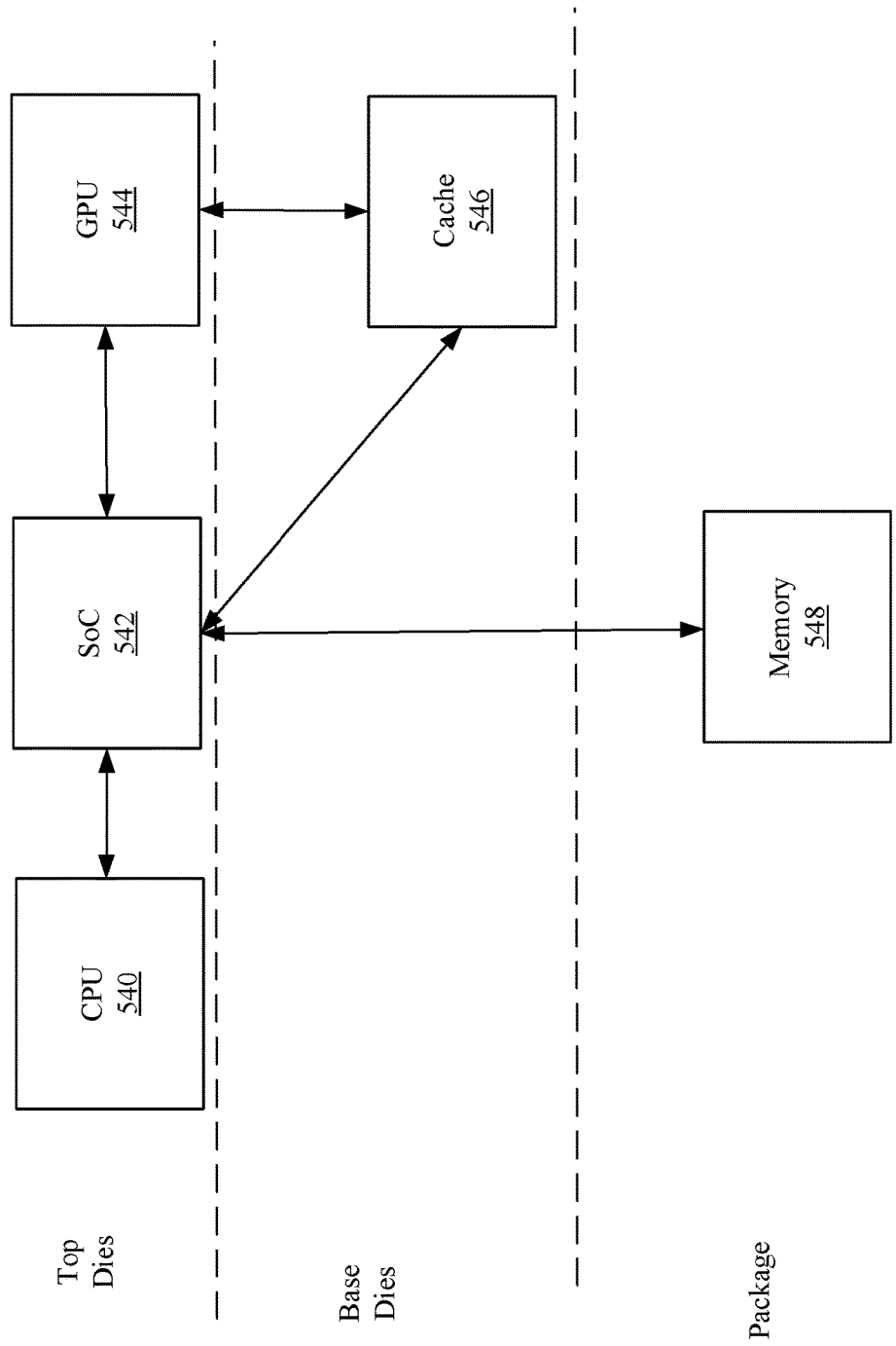
FIG. 10 is a schematic diagram of an example of a memory architecture according to an embodiment.

FIG. 10 illustrates a memory architecture that may implement aspects of the disclosure. The memory architecture may generally be implemented in a computing system and/or in conjunction with process 100 (FIG. 1), method 300 (FIG. 2), method 350 (FIG. 3), method 370 (FIG. 4), method 400 (FIG. 5), method 448 (FIG. 6), method 400 (FIG. 7), method 500 (FIG. 8), and/or monitor (FIG. 9) already discussed.

For example, some embodiments may use memory 548 (e.g., a DRAM) available on latest SoC die as static RAM (SRAM) for firmware access. The SoC 542 may also access cache 546 for firmware access, and also access CPU 540 and GPU 544 as part of firmware updates. In some embodiments, memory 548 may be omitted in the event that the memory 548 is unable to be initialized in an early boot stage.

Figure 11:
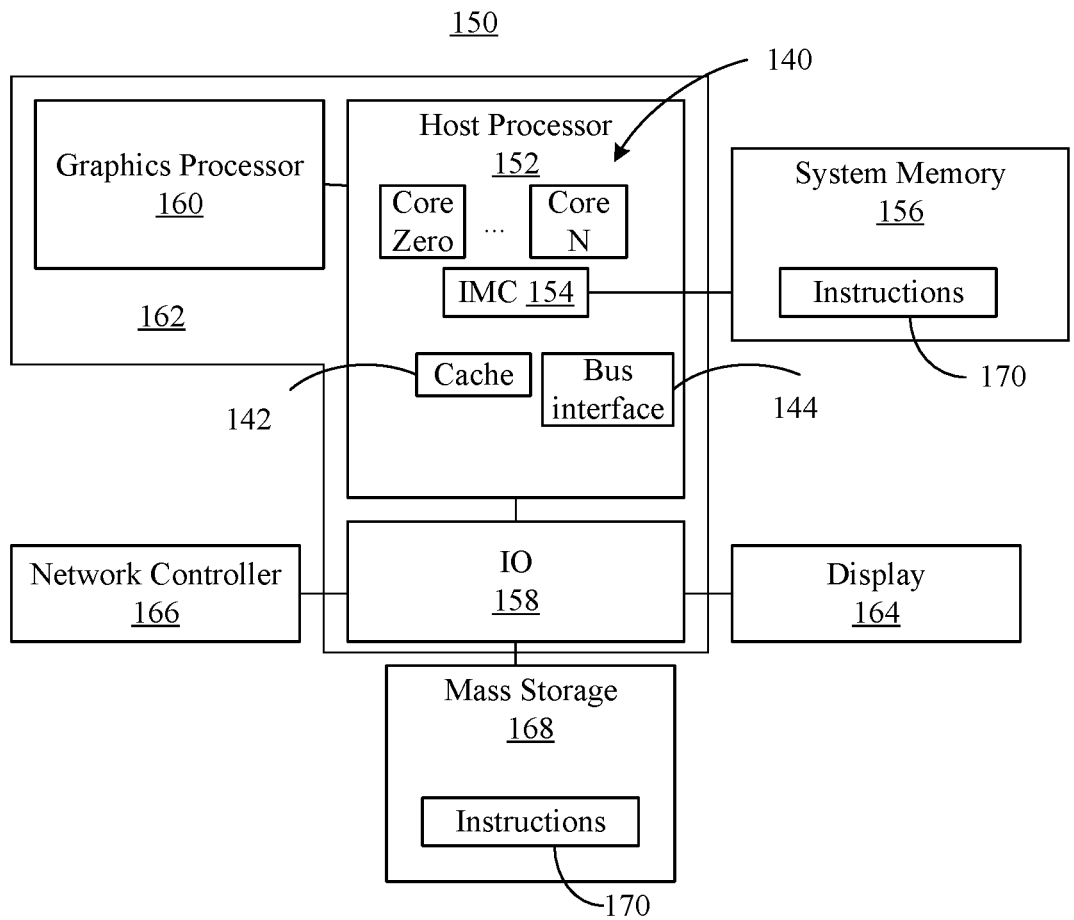
FIG. 11 is a block diagram of an example of a computing system according to an embodiment.

Turning now to FIG. 11, an efficiency enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., CPU) having an integrated memory controller (IMC) 154 that is coupled to a system memory 156.

The illustrated system 150 also includes an input output (10) module 158 implemented together with the host processor 152 and a graphics processor 160 (e.g., GPU) on a semiconductor die 162 as a SoC. The illustrated IO module 158 communicates with, for example, a display 164 (e.g., touch screen, liquid crystal display/LCD, light emitting diode/LED display), a network controller 166 (e.g., wired and/or wireless), and mass storage 168 (e.g., hard disk drive/HDD, optical disk, solid state drive/SSD, flash memory). The SoC 162 includes core zero-core N 140 that may execute a multi-threaded boot according to embodiments described herein. Data associated with the multi-threaded system may be stored in an on-board SoC cache 142. The SoC may further include a bus interface 144. The multithreaded operation may execute firmware updates and boot processes on a first subset of core zero-core N 140, and other platform firmware relate processes may be executed on a second subset of the first subset of core zero-core N 140.

The host processor 152, the graphics processor 160 and/or the IO module 158 may execute instructions 170 retrieved from the system memory 156 and/or the mass storage 168. In an embodiment, the computing system 150 implements process 100 (FIG. 1), method 300 (FIG. 2), method 350 (FIG. 3), method 370 (FIG. 4), method 400 (FIG. 5), method 448 (FIG. 6), method 400 (FIG. 7), method 500 (FIG. 8), monitor 550 (FIG. 9) and/or memory architecture (FIG. 10) already discussed. The illustrated computing system 150 is therefore considered to be efficiency-enhanced at least to the extent that it enables faster boot times with higher execution throughput.

Core zero-core N 140, IMC 154, SoC cache 142 and bus interface 144, graphics processor, IO 158 may be examples of SoC devices that are initiated, controlled and updated by FSPs, SoC firmware, etc. The network controller 166, mass storage 168, system memory 156 and display 164 may be examples of platform devices that are outside the SoC 162 and that may be updated, initiated and controlled through platform firmware separate from the SoC firmware. As already described the SoC firmware may operate in parallel with the platform firmware during boot processes to enhance efficiency.

Figure 12:
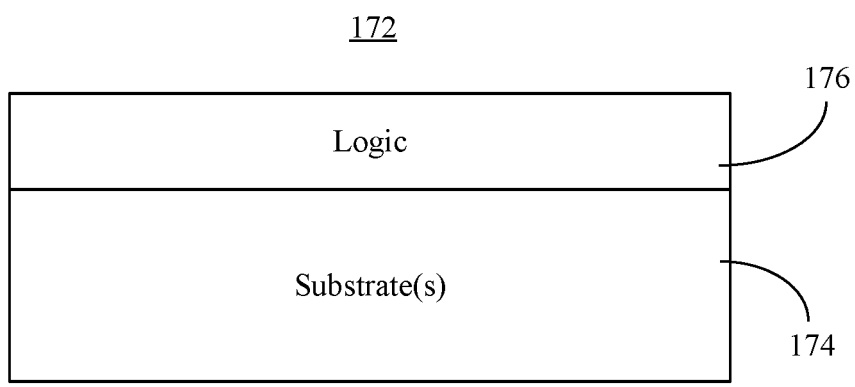
FIG. 12 is an illustration of an example of a semiconductor apparatus according to an embodiment.

FIG. 12 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the apparatus 172 implements aspects of process 100 (FIG. 1), method 300 (FIG. 2), method 350 (FIG. 3), method 370 (FIG. 4), method 400 (FIG. 5), method 448 (FIG. 6), method 400 (FIG. 7), method 500 (FIG. 8), monitor 550 (FIG. 9) and/or memory architecture (FIG. 10) already discussed.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 13:
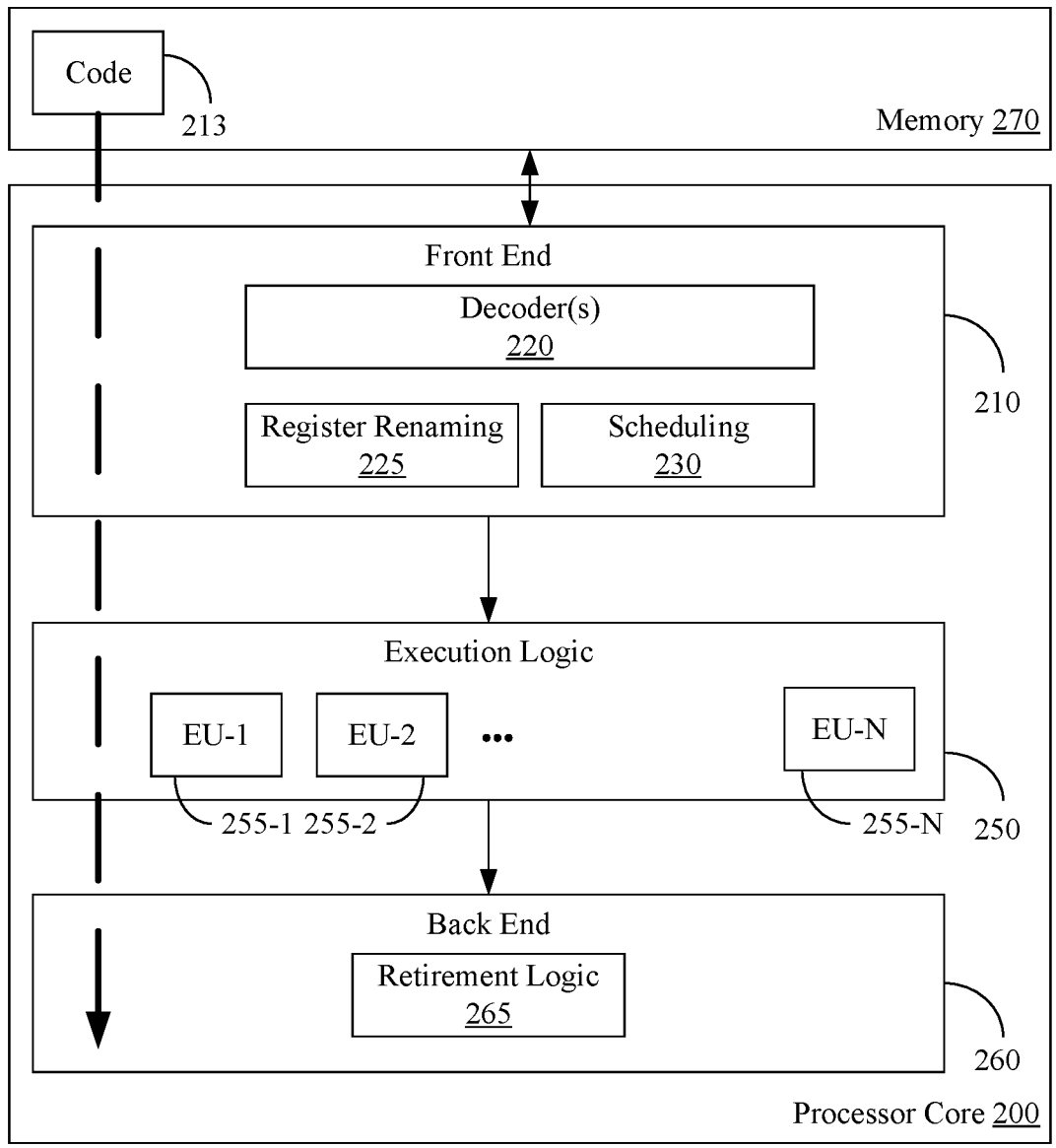
FIG. 13 is a block diagram of an example of a processor according to an embodiment.

FIG. 13 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 13, a processing element may alternatively include more than one of the processor core 200 illustrated in FIG. 13. The processor core 200 may be a single-threaded core or, for at least one embodiment, the processor core 200 may be multithreaded in that it may include more than one hardware thread context (or "logical processor") per core.

FIG. 13 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement aspects of the embodiments described herein. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 13, a processing element may include other elements on chip with the processor core 200. For example, a processing element may include memory control logic along with the processor core 200. The processing element may include I/O control logic and/or may include I/O control logic integrated with memory control logic. The processing element may also include one or more caches. The processor core 200 may implement one or more aspects of process 100 (FIG. 1), method 300 (FIG. 2), method 350 (FIG. 3), method 370 (FIG. 4), method 400 (FIG. 5), method 448 (FIG. 6), method 400 (FIG. 7), method 500 (FIG. 8), monitor 550 (FIG. 9) and/or memory architecture (FIG. 10) already discussed.

Referring now to FIG. 14, shown is a block diagram of a computing system 1000 embodiment in accordance with an embodiment. Shown in FIG. 14 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 14 may be implemented as a multi-drop bus rather than point-to-point interconnect.

As shown in FIG. 14, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 13.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 14, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 14, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 14, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the process 100 (FIG. 1), method 300 (FIG. 2), method 350 (FIG. 3), method 370 (FIG. 4), method 400 (FIG. 5), method 448 (FIG. 6), method 400 (FIG. 7), method 500 (FIG. 8), monitor (FIG. 9) and/or memory architecture (FIG. 10) already discussed. Further, an audio I/O 1024 may be coupled to second bus 1020 and a battery 1010 may supply power to the computing system 1000.

Note that other embodiments are contemplated. For example, instead of the point-to-point architecture of FIG. 14, a system may implement a multi-drop bus or another such communication topology. Also, the elements of FIG. 14 may alternatively be partitioned using more or fewer integrated chips than shown in FIG. 14.

ADDITIONAL NOTES AND EXAMPLES

Example 1 includes a performance-enhanced computing system comprising a system-on-chip including a host processor, and a memory including a set of executable program instructions, which when executed by the host processor, cause the computing system to identify, during a first boot process, whether at least one task associated with at least one software program is to be set to occur in a single-threaded process or a multithreaded process, in response to the at least one task being set to occur in the multithreaded process, execute the at least one task in the multithreaded process during the first boot process, and in response to the at least one task being set to occur in the single-threaded process, execute the at least one task in the single-threaded process during the first boot process.

Example 2 includes the computing system of Example 1, wherein the at least one software program is to be firmware associated with the system-on-chip.

Example 3 includes the computing system of Example 2, wherein the instructions, when executed, further cause the computing system to execute, during a first portion of the first boot process, at least one boot operation in a single threaded process, and execute, during a second portion of the first boot process, the at least one task in the multithreaded process.

Example 4 includes the computing system of Example 2, wherein the instructions, when executed, further cause the computing system to identify that the at least one task is to occur in the multithreaded process during the first boot process, dedicate a first group of processor cores of the host processor to the at least one task, and dedicate a second group of processor cores of the host processor to firmware execution associated with hardware devices communicatively connected to the system-on-chip.

Example 5 includes the computing system of Example 1, wherein the instructions, when executed, further cause the computing system to determine an amount of time to execute the at least one task during a second boot process, determine that the at least one task is to be updated in the multithreaded process based on the amount of time, store an identification to a data structure that the at least one task is to occur in the multithreaded process, access, during the first boot process, the data structure to identify that the at least one task is to occur in the multithreaded process, and execute the at least one task in the multithreaded process during the first boot process.

Example 6 includes the computing system of any one of Examples 1 to 5, wherein the at least one task is to include one or more of an update or an execution of the at least one software program.

Example 7 includes a semiconductor apparatus comprising one or more substrates, and logic coupled to the one or more substrates, wherein the logic is implemented in one or more of configurable logic or fixed-functionality logic hardware, the logic coupled to the one or more substrates to identify, during a first boot process, whether at least one task associated with at least one software program is to be set to occur in a single-threaded process or a multithreaded process, in response to the at least one task being set to occur in the multithreaded process, execute the at least one task in the multithreaded process during the first boot process, and in response to the at least one task being set to occur in the single-threaded process, execute the at least one task in the single-threaded process during the first boot process.

Example 8 includes the semiconductor apparatus of Example 7, wherein the at least one software program is to be firmware associated with a system-on-chip.

Example 9 includes the semiconductor apparatus of Example 8, wherein the logic is to execute, during a first portion of the first boot process, at least one boot operation in a single threaded process, and execute, during a second portion of the first boot process, the at least one task in the multithreaded process.

Example 10 includes the semiconductor apparatus of Example 8, wherein the logic is to identify that the at least one task is to occur in the multithreaded process during the first boot process, dedicate a first group of processor cores of a host processor of the system-on-chip to the at least one task, and dedicate a second group of processor cores of the host processor to firmware execution associated with hardware devices communicatively connected to the system-on-chip.

Example 11 includes the semiconductor apparatus of Example 7, wherein the logic is to determine an amount of time to execute the at least one task during a second boot process, determine that the at least one task is to be updated in the multithreaded process based on the amount of time, store an identification to a data structure that the at least one task is to occur in the multithreaded process, access, during the first boot process, the data structure to identify that the at least one task is to occur in the multithreaded process, and execute the at least one task in the multithreaded process during the first boot process.

Example 12 includes the semiconductor apparatus of any one of Examples 7 to 11, wherein the at least one task is to include one or more of an update or an execution of the at least one software program.

Example 13 includes the semiconductor apparatus of any one of Examples 7 to 11, wherein the logic coupled to the one or more substrates includes transistor channel regions that are positioned within the one or more substrates.

Example 14 includes at least one computer readable storage medium comprising a set of instructions, which when executed by a computing system, cause the computing system to identify, during a first boot process, whether at least one task associated with at least one software program is to be set to occur in a single-threaded process or a multithreaded process, in response to the at least one task being set to occur in the multithreaded process, execute the at least one task in the multithreaded process during the first boot process, and in response to the at least one task being set to occur in the single-threaded process, execute the at least one task in the single-threaded process during the first boot process.

Example 15 includes the at least one computer readable storage medium of Example 14, wherein the at least one software program is to be firmware associated with a system-on-chip.

Example 16 includes the at least one computer readable storage medium of Example 15, wherein the instructions, when executed, further cause the computing system to execute, during a first portion of the first boot process, at least one boot operation in a single threaded process, and execute, during a second portion of the first boot process, the at least one task in the multithreaded process.

Example 17 includes the at least one computer readable storage medium of Example 15, wherein the instructions, when executed, further cause the computing system to identify that the at least one task is to occur in the multithreaded process during the first boot process, dedicate a first group of processor cores of a host processor of the system-on-chip to the at least one task, and dedicate a second group of processor cores of the host processor to firmware execution associated with hardware devices communicatively connected to the system-on-chip.

Example 18 includes the at least one computer readable storage medium of Example 14, wherein the instructions, when executed, further cause the computing system to determine an amount of time to execute the at least one task during a second boot process, determine that the at least one task is to be updated in the multithreaded process based on the amount of time, store an identification to a data structure that the at least one task is to occur in the multithreaded process, access, during the first boot process, the data structure to identify that the at least one task is to occur in the multithreaded process, and execute the at least one task in the multithreaded process during the first boot process.

Example 19 includes the at least one computer readable storage medium of any one of Examples 14 to 18, wherein the at least one task is to include one or more of an update or an execution of the at least one software program.

Example 20 includes a method comprising identifying, during a first boot process, whether at least one task associated with at least one software program is set to occur in a single-threaded process or a multithreaded process, in response to the at least one task being set to occur in the multithreaded process, executing the at least one task in the multithreaded process during the first boot process, and in response to the at least one task being set to occur in the single-threaded process, executing the at least one task in the single-threaded process during the first boot process.

Example 21 includes the method of Example 20, wherein the at least one software program is firmware associated with a system-on-chip.

Example 22 includes the method of Example 21, further including executing, during a first portion of the first boot process, at least one boot operation in a single threaded process, and executing, during a second portion of the first boot process, the at least one task in the multithreaded process.

Example 23 includes the method of Example 21, further including identifying that the at least one task will occur in the multithreaded process during the first boot process, dedicating a first group of processor cores of a host processor of the system-on-chip to the at least one task, and dedicating a second group of processor cores of the host processor to firmware execution associated with hardware devices communicatively connected to the system-on-chip.

Example 24 includes the method of Example 20, further including determining an amount of time to execute the at least one task during a second boot process, determining that the at least one task will be updated in the multithreaded process based on the amount of time, storing an identification to a data structure that the at least one task will occur in the multithreaded process, accessing, during the first boot process, the data structure to identify that the at least one task will occur in the multithreaded process, and executing the at least one task in the multithreaded process during the first boot process.

Example 25 includes the method of any one of Examples 20 to 24, wherein the at least one task includes one or more of an update or an execution of the at least one software program.

Example 26 includes a semiconductor apparatus comprising one or more substrates, and logic coupled to the one or more substrates, wherein the logic is implemented in one or more of configurable logic or fixed-functionality logic hardware, the logic coupled to the one or more substrates to means for identifying, during a first boot process, whether at least one task is to be associated with at least one software program that is to be set to occur in a single-threaded process or a multithreaded process, means for in response to the at least one task being set to occur in the multithreaded process, executing the at least one task in the multithreaded process during the first boot process, and means for in response to the at least one task being set to occur in the single-threaded process, executing the at least one task in the single-threaded process during the first boot process.

Example 27 includes the semiconductor apparatus of Example 26, wherein the at least one software program is to be firmware associated with a system-on-chip.

Example 28 includes the semiconductor apparatus of Example 27, further including means for executing, during a first portion of the first boot process, at least one boot operation in a single threaded process, and means for executing, during a second portion of the first boot process, the at least one task in the multithreaded process.

Example 29 includes the semiconductor apparatus of Example 27, further including means for identifying that the at least one task is to occur in the multithreaded process during the first boot process, means for dedicating a first group of processor cores of a host processor of the system-on-chip to the at least one task, and means for dedicating a second group of processor cores of the host processor to firmware execution to be associated with hardware devices communicatively connected to the system-on-chip.

Example 30 includes the semiconductor apparatus of Example 26, further including means for determining an amount of time to execute the at least one task during a second boot process, means for determining that the at least one task is to be updated in the multithreaded process based on the amount of time, means for storing an identification to a data structure that the at least one task is to occur in the multithreaded process, means for accessing, during the first boot process, the data structure is to identify that the at least one task will occur in the multithreaded process, and means for executing the at least one task in the multithreaded process during the first boot process.

Example 31 includes the semiconductor apparatus of any one of Examples 26 to 30, wherein the at least one task is to include one or more of an update or an execution of the at least one software program.

Thus, technology described herein may support expedient updates and firmware updated during a boot process.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A performance-enhanced computing system comprising:
    a system-on-chip including a host processor; and
    a memory including a set of executable program instructions, which when executed by the host processor, cause the computing system to:
        determine an amount of time to execute at least one task associated with at least one software program during a previous boot process;
        set the at least one task to occur in a single-threaded process or a multithreaded process based on the amount of time to execute the at least one task;
        in response to the at least one task being set to occur in the multithreaded process, execute the at least one task in the multithreaded process during a following boot process; and
        in response to the at least one task being set to occur in the single-threaded process, execute the at least one task in the single-threaded process during the following boot process.

2. The computing system of claim 1, wherein to set the at least one task to occur in the single-threaded process or the multithreaded process, the instructions, when executed, further cause the computing system to:
    set the at least one task to occur in the single-threaded process if the amount of time fails to meet a threshold; and
    set the at least one task to occur in the multithreaded process if the amount of time meets the threshold,
    wherein the at least one software program is to be firmware associated with the system-on-chip.

3. The computing system of claim 2, wherein the instructions, when executed, further cause the computing system to:
    execute, during a first portion of the following boot process, at least one boot operation in a single threaded process; and
    execute, during a second portion of the following boot process, the at least one task in the multithreaded process,
    wherein the at least one task is an execution of the at least one software program.

4. The computing system of claim 2, wherein the instructions, when executed, further cause the computing system to:
    identify that the at least one task is to occur in the multithreaded process during the first following boot process;
    dedicate a first group of processor cores of the host processor to the at least one task; and
    dedicate a second group of processor cores of the host processor to firmware execution associated with hardware devices communicatively connected to the system-on-chip.

5. The computing system of claim 1, wherein the instructions, when executed, further cause the computing system to:
    store an identification to a data structure that the at least one task is to occur in the multithreaded process;
    access, during the following boot process, the data structure to identify that the at least one task is to occur in the multithreaded process; and
    execute the at least one task in the multithreaded process during the following boot process.

6. The computing system of claim 1, wherein the at least one task is to include one or more of an update or an execution of the at least one software program.

7. A semiconductor apparatus comprising:
    one or more substrates; and logic coupled to the one or more substrates, wherein the logic is implemented in one or more of configurable logic or fixed-functionality logic hardware, the logic coupled to the one or more substrates to:

determine an amount of time to execute at least one task associated with at least one software program during a previous boot process;

set the at least one task to occur in a single-threaded process or a multithreaded process based on the amount of time to execute the at least one task;

in response to the at least one task being set to occur in the multithreaded process, execute the at least one task in the multithreaded process during a following boot process; and in response to the at least one task being set to occur in the single-threaded process, execute the at least one task in the single-threaded process during the following boot process.

8. The semiconductor apparatus of claim 7, wherein to set the at least one task to occur in the single-threaded process or the multithreaded process, the logic coupled to the one or more substrates is to:

set the at least one task to occur in the single-threaded process if the amount of time fails to meet a threshold; and set the at least one task to occur in the multithreaded process if the amount of time meets the threshold, wherein the at least one software program is firmware associated with a system-on-chip.

9. The semiconductor apparatus of claim 8, wherein the logic is to:

execute, during a first portion of the following boot process, at least one boot operation in a single threaded process; and execute, during a second portion of the following boot process, the at least one task in the multithreaded process, wherein the at least one task is an execution of the at least one software program.

10. The semiconductor apparatus of claim 8, wherein the logic is to:

identify that the at least one task is to occur in the multithreaded process during the following boot process;

dedicate a first group of processor cores of a host processor of the system-on-chip to the at least one task; and dedicate a second group of processor cores of the host processor to firmware execution associated with hardware devices communicatively connected to the system-on-chip.

11. The semiconductor apparatus of claim 7, wherein the logic is to:

store an identification to a data structure that the at least one task is to occur in the multithreaded process;

access, during the following boot process, the data structure to identify that the at least one task is to occur in the multithreaded process; and execute the at least one task in the multithreaded process during the following boot process.

12. The semiconductor apparatus of claim 7, wherein the at least one task is to include one or more of an update or an execution of the at least one software program.

13. The semiconductor apparatus of claim 7, wherein the logic coupled to the one or more substrates includes transistor channel regions that are positioned within the one or more substrates.

14. At least one non-transitory computer readable storage medium comprising a set of instructions, which when executed by a computing system, cause the computing system to:

determine an amount of time to execute at least one task associated with at least one software program during a previous boot process;

set the at least one task to occur in a single-threaded process or a multithreaded process based on the amount of time to execute the at least one task;

in response to the at least one task being set to occur in the multithreaded process, execute the at least one task in the multithreaded process during a following boot process; and in response to the at least one task being set to occur in the single-threaded process, execute the at least one task in the single-threaded process during the following boot process.

15. The at least one non-transitory computer readable storage medium of claim 14, wherein to set the at least one task to occur in the single-threaded process or the multithreaded process, the instructions, when executed, further cause the computing system to:

set the at least one task to occur in the single-threaded process if the amount of time fails to meet a threshold; and set the at least one task to occur in the multithreaded process if the amount of time meets the threshold, wherein the at least one software program is firmware associated with a system-on-chip.

16. The at least one non-transitory computer readable storage medium of claim 15, wherein the instructions, when executed, further cause the computing system to:

execute, during a first portion of the following boot process, at least one boot operation in a single threaded process; and execute, during a second portion of the following boot process, the at least one task in the multithreaded process, wherein the at least one task is an execution of the at least one software program.

17. The at least one non-transitory computer readable storage medium of claim 15, wherein the instructions, when executed, further cause the computing system to:

identify that the at least one task is to occur in the multithreaded process during the following boot process;

dedicate a first group of processor cores of a host processor of the system-on-chip to the at least one task; and dedicate a second group of processor cores of the host processor to firmware execution associated with hardware devices communicatively connected to the system-on-chip.

18. The at least one non-transitory computer readable storage medium of claim 14, wherein the instructions, when executed, further cause the computing system to:

store an identification to a data structure that the at least one task is to occur in the multithreaded process;

access, during the following boot process, the data structure to identify that the at least one task is to occur in the multithreaded process; and execute the at least one task in the multithreaded process during the following boot process.

19. The at least one non-transitory computer readable storage medium of claim 14, wherein the at least one task is to include one or more of an update or an execution of the at least one software program.

20. A method comprising:
  determining an amount of time to execute at least one task associated with at least one software program during a previous boot process;
  setting the at least one task to occur in a single-threaded process or a multithreaded process based on the amount of time to execute the at least one task;
  in response to the at least one task being set to occur in the multithreaded process, executing the at least one task in the multithreaded process during a following boot process; and
  in response to the at least one task being set to occur in the single-threaded process, executing the at least one task in the single-threaded process during the following boot process.

21. The method of claim 20, wherein the setting the at least one task to occur in the single-threaded process or the multithreaded process comprises:
  setting the at least one task to occur in the single-threaded process if the amount of time fails to meet a threshold; and
  setting the at least one task to occur in the multithreaded process if the amount of time meets the threshold,
  wherein the at least one software program is firmware associated with a system-on-chip.

22. The method of claim 21, further including:
  executing, during a first portion of the following boot process, at least one boot operation in a single threaded process; and
  executing, during a second portion of the following boot process, the at least one task in the multithreaded process,
  wherein the at least one task is an execution of the at least one software program.

23. The method of claim 21, further including:
  identifying that the at least one task will occur in the multithreaded process during the following boot process;
  dedicating a first group of processor cores of a host processor of the system-on-chip to the at least one task; and
  dedicating a second group of processor cores of the host processor to firmware execution associated with hardware devices communicatively connected to the system-on-chip.

24. The method of claim 20, further including:
  storing an identification to a data structure that the at least one task will occur in the multithreaded process;
  accessing, during the following boot process, the data structure to identify that the at least one task will occur in the multithreaded process; and
  executing the at least one task in the multithreaded process during the following boot process.

25. The method of claim 20, wherein the at least one task includes one or more of an update or an execution of the at least one software program.

* * * * *